(12) United States Patent
Nakagawa

(10) Patent No.: US 7,365,878 B2
(45) Date of Patent: Apr. 29, 2008

(54) COLOR ADJUSTMENT APPARATUS, PRINT CONTROL APPARATUS, COLOR ADJUSTMENT METHOD, AND COLOR ADJUSTMENT PROGRAM PRODUCT

(75) Inventor: Tomohiro Nakagawa, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 777 days.

(21) Appl. No.: 10/796,801

(22) Filed: Mar. 9, 2004

(65) Prior Publication Data

US 2005/0122533 A1    Jun. 9, 2005

(30) Foreign Application Priority Data

Mar. 12, 2003    (JP)    ............................. 2003-067073

(51) Int. Cl.
*G06F 15/00*    (2006.01)
(52) U.S. Cl. ........................................ 358/1.9; 358/518
(58) Field of Classification Search ................. 358/1.9, 358/518
See application file for complete search history.

(56) References Cited

U.S. PATENT DOCUMENTS

| 5,579,031 A | 11/1996 | Liang | ......................... 345/604 |
| 2001/0017719 A1 | 8/2001 | Asano | ......................... 358/518 |

FOREIGN PATENT DOCUMENTS

| JP | 09-186907 | 7/1997 |
| JP | 10-032724 | 2/1998 |
| JP | 10-224647 | 8/1998 |
| JP | 11-234530 | 8/1999 |
| JP | 2000-333032 | 11/2000 |
| JP | 2002-094816 | 3/2002 |
| JP | 2002-223364 | 8/2002 |
| JP | 2002-290753 | 10/2002 |

*Primary Examiner*—Kimberly Williams
*Assistant Examiner*—Michael Burleson
(74) *Attorney, Agent, or Firm*—Hogan & Hartson LLP

(57) ABSTRACT

Conventional technology does not permit adequate color adjustment easily for various kinds of images. This invention eliminates this disadvantage by outputting a preview image of the input image according to image data, acquiring information about unadjusted color which represents the color to be adjusted and which is contained in said preview image, causing the printer (printing apparatus) 20 to print more than one color among from the color and its neighboring colors represented by said information about unadjusted color based on the information about unadjusted color which has been acquired, specifying the information about adjusted color which represents more than one printed color as the standard information at the time of color adjustment, and generating the adjusted image data which expresses the adjusted image to be printed by the printer 20 from the image data based on the information about unadjusted color and the information about adjusted color. In this way it is possible to accomplish adequate color adjustment rapidly and easily for various kinds of images.

14 Claims, 13 Drawing Sheets

COLOR ADJUSTMENT APPARATUS, PRINT CONTROL APPARATUS, COLOR ADJUSTMENT METHOD, AND COLOR ADJUSTMENT PROGRAM PRODUCT

BACKGROUND OF THE INVENTION

1. Field of the Invention

The present invention relates to a color adjustment apparatus, a print control apparatus, a color adjustment method, and a color adjustment program product, which are intended to create data expressing adjusted images to be printed by a printing apparatus, with the input image color-adjusted.

2. Description of the Prior Art

There has been known a printing technology which involves color adjustment for input images by the printing (with a printer) of colors to be adjusted. (See, for example, Japanese Patent Laid-open No. 2002-290753.) This technology achieves its object by causing the printer to print a predetermined typical color and, at the same time, generating more than one kind of information about its neighboring colors and causing them to be displayed on the screen. The neighboring colors are represented with adequately varied hue, chroma, and lightness. The color information selected by the user reflects the color profile. In this way the user can make approximate color adjustment without requiring complex processes in the case where the color on the monitor does not agree with the color of print output.

The above-mentioned technology, however, is not able to perform adequate color adjustment easily for any kind of images, because images include natural images and non-natural images, such as graphic images and computer graphic images, and natural images have a variety of color tones. In other words, it needs repeated printing on trial-and-error basis in order to accomplish adequate color adjustment for individual images. The procedure in this manner takes a long time.

There has been an apparatus which displays colors to be adjusted on the color monitor and allows the user to specify the adjusted colors, so that color-adjusted images are displayed on the monitor. (See, for example, Japanese Patent Laid-open Nos. H9-186907, H10-224647, and 2000-333032.) Being not designed to cause the printer to print colors to be adjusted, it cannot be applied to the process for achieving color adjustment of input images by printing.

There is known an apparatus which causes the printer to print several color-adjusted images and allows the user to select one image with adjusted colors. (See, for example, Japanese Patent Laid-open No. 2002-223364.) The disadvantage of this apparatus is that printing several actual images according to image data takes a long time.

Sensory color adjustment by the tone curve editor or the slide bar for individual colors does not permit the user to adjust a desired color only but requires him to repeat printing for subtle color adjustment, which takes a very long time.

SUMMARY OF THE INVENTION

The present invention was completed in view of the foregoing. It is an object of the present invention to provide a color adjustment apparatus, a print control apparatus, a color adjustment method, and a color adjustment program product, which permit speedy and easy color adjustment for input images of different kinds in such a way that data for adjusted images is generated by printing colors to be adjusted.

Color adjustment according to the present invention is accomplished in the following way. The first step starts with the acquisition of unadjusted colors. This step produces a preview image from an input image according to image data expressing the input image in terms of color component values for a multiplicity of pixels. The preview image of the input image can be confirmed by the user of the color control apparatus. The color to be adjusted is contained in the preview image. This color is represented by the information about unadjusted color, which is acquired by the step of acquiring unadjusted color. The thus acquired information about unadjusted color is used by the step for print control of neighboring colors in order to control printing with colors including the color (and its neighboring colors) represented by the information about unadjusted color. Then, the printing apparatus prints these colors. The subsequent step specifies the information about adjusted color representing any one of the printed colors, said information being the standard information to be used at the time of color adjustment. The subsequent step generates the adjusted image data which represents adjusted images to be printed on the printing apparatus, with color adjustment performed on the input image from the image data. Thus, the printing apparatus is ready to print the adjusted image according to the thus generated data for adjusted image.

The adjusted image data generated as mentioned above gives the adjusted image. This adjusted image has its color adjusted, with the color for adjustment determined through the previewed input image. Therefore, it permits adequate color adjustment according to the kind of input image (natural image or non-natural image). The colors for adjustment to be printed by the printing apparatus are not actual images and hence printing does not take a long time. Thus the above-mentioned procedure permits speedy and easy color adjustment for input images of different kinds in such a way that data for adjusted images is generated by printing colors to be adjusted.

The above-mentioned preview image may be displayed on a display (or any other monitor) or printed by a printer (or any other printing apparatus).

The above-mentioned adjusted color information may include the amount of change in color due to color adjustment and the color component values of color that has varied after color adjustment, and another information.

The above-mentioned step for acquiring unadjusted color may output the preview image for the adjusted image according to the adjusted image data and then acquire the unadjusted color information which represents the color to be adjusted which is contained in the preview image. The above-mentioned step for specifying the adjusted color may specify again the information about the adjusted color. The step for generating the adjusted image may generate again the data of adjusted image. The user can accomplish color adjustment while watching the preview image (which corresponds to the color-adjusted image input); therefore, the user can accomplish adequate color adjustment rapidly and easily in accordance with the kinds of images.

The foregoing configuration may be modified as follows. The above-mentioned information about unadjusted color is the color component value for unadjusted colors which represents in terms of color component value the color to be adjusted which is contained in the above-mentioned preview image. The above-mentioned information about adjusted color is information about the difference between the color component value which represents any of the printed colors and the color component value of unadjusted color. The above-mentioned step for producing the adjusted image obtains from the color component value before adjustment and the information about adjusted color the color component value after adjustment which represents any of the printed colors and then generates the data of adjusted image from the image data such that the color component value before adjustment is the color component value after adjustment. Such modification permits adequate color adjustment rapidly and easily in accordance with the kinds of images despite the simple information about colors before and after adjustment.

If the data of adjusted image is generated such that there will be no difference in color component value, then more adequate color adjustment would be possible.

The above-mentioned step for generating adjusted image may be modified such that it generates the data for adjusted image from the image data by referencing a color adjustment table which associates the color component value before adjustment with the information about adjusted color which denotes the difference in the color component value. The simple configuration of referencing a color adjustment table permits adequate color adjustment rapidly and easily in accordance with the kinds of images.

The foregoing configuration may also be modified as follows. The above-mentioned information about unadjusted color is the color component value before adjustment which represents in terms of color component value the color to be adjusted which is contained in the preview image. The above-mentioned information about adjusted color is the color component value after adjustment which represents in terms of color component value any one of the printed colors. The above-mentioned step for generating adjusted image generates the data for adjusted image from the image data such that the color component value before adjustment is the color component value after adjustment. This modified configuration also permits adequate color adjustment rapidly and easily in accordance with the kinds of images.

Another embodiment of the present invention may be configured such that the preview image corresponding to the print image of the standard printing apparatus is displayed on the image display apparatus together with the input image and the preview image for adjusted image. In this way the user can perform color adjustment while watching the preview image corresponding to the print image of the standard printing apparatus. This permits adequate color adjustment rapidly and easily.

The foregoing configuration may be modified such that the above-mentioned step for acquiring unadjusted color outputs the enlarged preview image of the input image (with colors separated for individual pixels) and then acquires the information about unadjusted color which represents the color to be adjusted (which is contained in the color-separated output).

Also, the foregoing configuration may be modified such that the above-mentioned printing apparatus prints the color chart (in honeycomb pattern) in which different elemental colors vary stepwise in three directions, with the center being the color (or neighboring colors thereof) represented by the information about unadjusted color.

Any of the modified configurations permits adequate color adjustment rapidly and easily.

The foregoing configuration may be modified as follows. Another step is added which generates data to express the image of varying region and output the image of varying region according to said data. (The varying region is one in which color changes due to color adjustment in correspondence to the input image according to the information about color before and after adjustment.) The above-mentioned step for generating the adjusted image generates the data for adjusted image that expresses the adjusted image to be printed by the printing apparatus from the image data according to the information about color before and after adjustment which has generated the data expressing the image in varying region which has been output. The user can accomplish color adjustment while watching the image of varying region corresponding to the input image; the user can accomplish adequate color adjustment rapidly and easily in accordance with the kinds of images.

In this case, it may generate the print image data and adjusted image data while referencing the color profile and then generate the varying region image data according to the difference between the two kinds of data. The simple configuration of referencing a color profile permits adequate color adjustment rapidly and easily in accordance with the kinds of images.

Also, it may generate the varying region image data in which the component value is the difference between the component values in the two kinds of data. This simple configuration, in which the component value of the varying region image data is the difference between the two kinds of data, permits adequate color adjustment rapidly and easily in accordance with the kinds of images.

Moreover, it may obtain the component value expressing achromatic color from the difference between the two kinds of data and generate the varying region image data which is represented by said component value. This makes it possible to grasp at a glance the effect of color adjustment and hence permits adequate color adjustment rapidly and easily.

Here, the foregoing configuration allows the user to accomplish color adjustment while watching the varying region image corresponding to the input image without the necessity of printing colors to be adjusted. This permits adequate color adjustment rapidly and easily in accordance with the kinds of images.

Consequently, the configuration may be modified as follows. That is, the step for acquiring unadjusted color acquires the information about unadjusted color which represents the color to be adjusted and which is contained in the input image, according to the image data expressing the input image in terms of color component value for a large number of pixels. The step for specifying adjusted color accepts the input of the information about adjusted color expressing the adjusted color for the color represented by the information about unadjusted color. Upon reception of this input, the step for outputting varying region generates the varying region image data which expresses the varying region image which shows the region in which color changes due to color adjustment on the input image according to the image data and the information about unadjusted color and adjusted color, and it outputs the varying region image according to the thus generated varying region image data. And, the step for generating adjusted image generates the adjusted image data which expresses the adjusted image to be printed by the printing apparatus, by color adjustment of input image from the input data, based on the information about unadjusted color and adjusted color which has generated the varying region image data which expresses the varying region image which has been output. Then, the printing apparatus is ready to print the adjusted image based on the adjusted image data which has been generated as mentioned above.

Here, the adjusted image based on the adjusted image data generated as mentioned above in one which has undergone color adjustment according to the information about unadjusted color and adjusted color which causes the varying region to be output. Therefore, it permits adequate color adjustment according to the kind of input image (such as natural image or non-natural image). In this case, it is not necessary to cause the printing apparatus to print actual images, and hence color adjustment does not take an excessively long time. Therefore, when it generates the adjusted image data which expresses the adjusted image to be printed by the printing apparatus after color adjustment of the input image, it is possible to perform adequate color adjustment rapidly and easily according to the kind of image.

Incidentally, the above-mentioned modifications may be applied to the above-mentioned embodiments.

The above-mentioned color adjustment method may be practiced alone or may be practiced in combination with other methods built into a certain device. The idea of the present invention includes various embodiments, which can be changed as occasion demands. The present invention may be practiced in the printing apparatus, and its action is basically the same as above.

Also, the present invention may be embodied as the color adjustment apparatus which practices the color adjustment processing according to a prescribed procedure.

Moreover, the present invention may be applied to the color adjustment system consisting of the color adjustment apparatus and the printing apparatus, and its action is basically the same as above.

When the present invention is practice, there will be an instance in which a prescribed program is executed in the color adjustment apparatus. Therefore, the present invention may be applied to a program product to control the color adjustment apparatus, and its action is basically the same as above. Furthermore, it would be possible that those media storing the program product are circulated and the program product is read into the computer from the media. That is, the present invention may be applied to the computer-readable recording medium storing the program product, and its action is basically the same as above.

Here, the recording medium may be magnetic recording medium or magneto-optical recording medium or any other recording medium to be developed in the future. It may be a primary copy or secondary copy whatsoever. The idea of the present invention covers an instance in which it is materialized in hardware or in which part is recorded on a recording medium and is read whenever necessary.

DESCRIPTION OF THE PREFERRED EMBODIMENTS

The invention will be described with reference to its embodiments in the following order.
(1) Configuration of printing system:
(2) Configuration of color adjustment apparatus:
(3) Processing by color control apparatus:
(4) Summary:

(1) Configuration of Printing System

Figure 1:
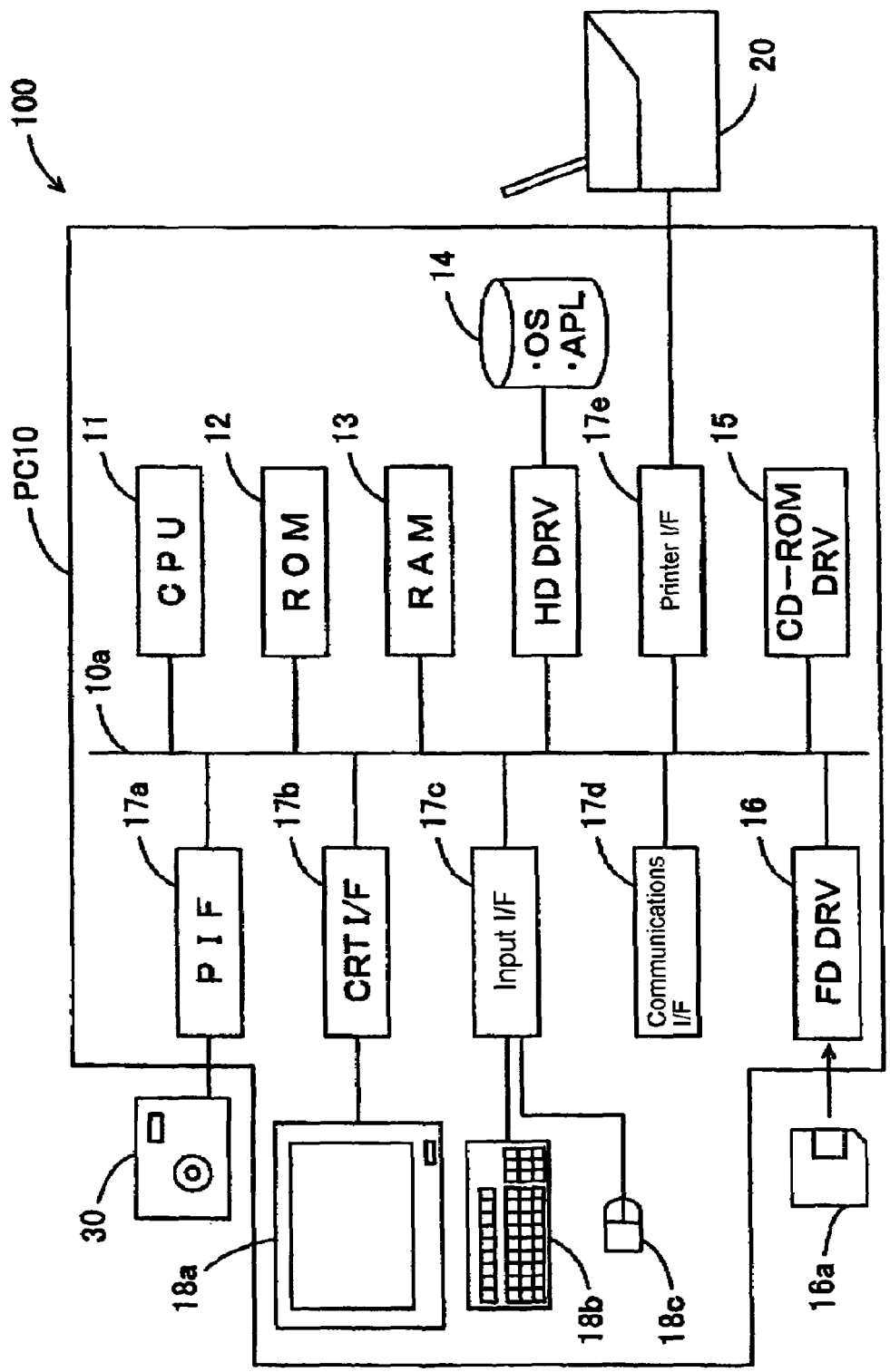
FIG. 1 is a schematic diagram showing a printing system consisting of a color adjustment apparatus and peripheral equipment.

FIG. 1 is a schematic diagram showing the printing system 100 containing the color adjustment apparatus pertaining to one embodiment of the present invention. This printing system 100 consists of a personal computer (PC) 10 and an inkjet printer 20 (as a printing apparatus) capable of color printing. The PC 10 functions as the color adjustment apparatus in a sense that it creates data that represents adjusted images to be printed by the printer. It also functions as the print control apparatus in a sense that it causes the printer to print the adjusted images.

The PC 10 has the CPU 11 which works as the nucleus for arithmetic operations. This CPU 11 controls the entire PC 10 through the system bus 10*a*, to which are connected the ROM 12, the RAM 13, the CD-ROM drive 15, the flexible disk (FD) drive 16, and various interfaces (I/F) 17*a*-17*e*. To the system bus 10*a* is also connected the hard disk (HD) 14 through the hard disk drive. The computer used in this embodiment is a desktop PC; however, any one with general configuration is acceptable.

The HD 14 stores the operating system (OS) and the application program (APL) that creates image information etc. At the run time, the CPU 11 transfers the software to the RAM 13 and accesses it as occasion demands to execute programs while using it a temporary work area.

The peripheral equipment I/F (PIF) 17*a* permits connection to the digital camera 30 and a scanner (not shown). The digital camera 30 creates image data and outputs it to the PC 10. This image data expresses a photographed image composed of dot matrix pixels, each having gradation represented in terms of color component values. To the CRT I/F 17*b* is connected the display (CRT or any other image display apparatus) 18*a*, which displays images based on the image data. To the input I/F 17*c* is connected the keyboard 18*b* and the mouse 18*ca* for input operation. To the printer I/F 17*e* is connected the printer 20 through a parallel I/F cable, for example.

The printer 20 prints images on a printing medium (printing paper) with C (cyan), M (magenta), Y (yellow), and K (black) inks. It ejects each ink in an amount corresponding to the color component value (or the gradation value) for the image data. Needless to say, any printer may be acceptable which uses other inks than the above-mentioned four inks. Various printing apparatus can be used, such as inkjet printers of bubble type (which eject ink by means of bubbles generated in the ink passage) and laser printers.

Figure 2:
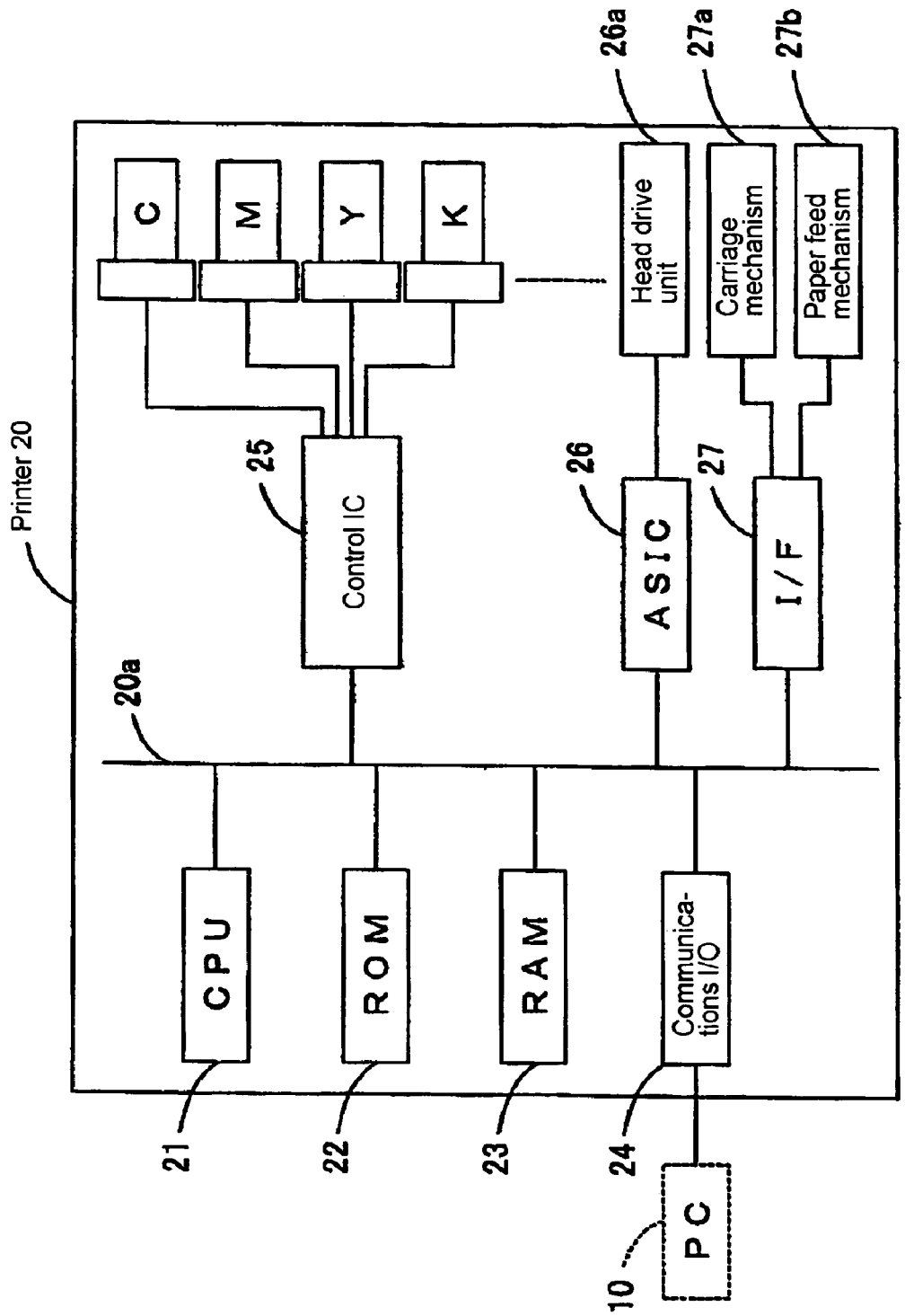
FIG. 2 is a block diagram of a printer connected to a PC.

As shown in FIG. 2, the printer 20 has the CPU 21, the ROM 22, the RAM 23, the communication I/O 24, the control IC 25, the ASIC 26, and the I/F 27, which are connected to one another through the bus 20a. The communication I/O 24 is connected to the printer I/F 17e of the PC 10. The printer 20 receives print jobs from the PC 10 through the communication I/O 24. Each print job consists of CMYK data and page description language. The ASIC 26 sends and receives signals to and from the CPU 21, thereby supplying the head drive unit 26a with data of voltage to be applied according to CMYK data. The head drive unit 26a generates, according to the data of voltage application, a pattern of voltage to be applied to the piezoelectric element contained in the printing head, and then it causes the printing head to eject CMYK inks. The carriage mechanism 27a and the paper feed mechanism 27b, which are connected to the I/F 27, respectively causes the printing head to traverse printing paper and feeds and advances printing paper. The CPU 21 controls each unit according to the programs written in the ROM 22 while using the RAM 23 as the work area.

The PC 10 configured with the above-mentioned hardware executes the BIOS and also executes the OS and APL in the layer above the BIOS. The OS is incorporated with various drivers, such as the printer driver which controls the printer I/F 17e, so that it controls the hardware. The printer driver is capable of two-way communications with the printer 20 through the printer I/F 17e. It receives image data from the APL to create print jobs and sends them to the printer 20. The color control program according to the present invention may be either the printer driver or the APL. It is stored in the HD 14, which may be replaced by any other medium such as CD-ROM, FD 16a, magneto-optical disk, non-volatile memory, punch card, or barcode (or code-printed medium). Needless to say, the control program may be downloaded for execution from a specific server on the Internet through the communications I/F 17d.

The above-mentioned hardware and program in combination constitute the color control apparatus and the print control apparatus.

The color adjustment apparatus adjusts the CRT screen so that it produces a desired color to the eye, and finally prints several colors which are close to but subtly different from that color.

(2) Configuration of Color Adjustment Apparatus

Figure 3:
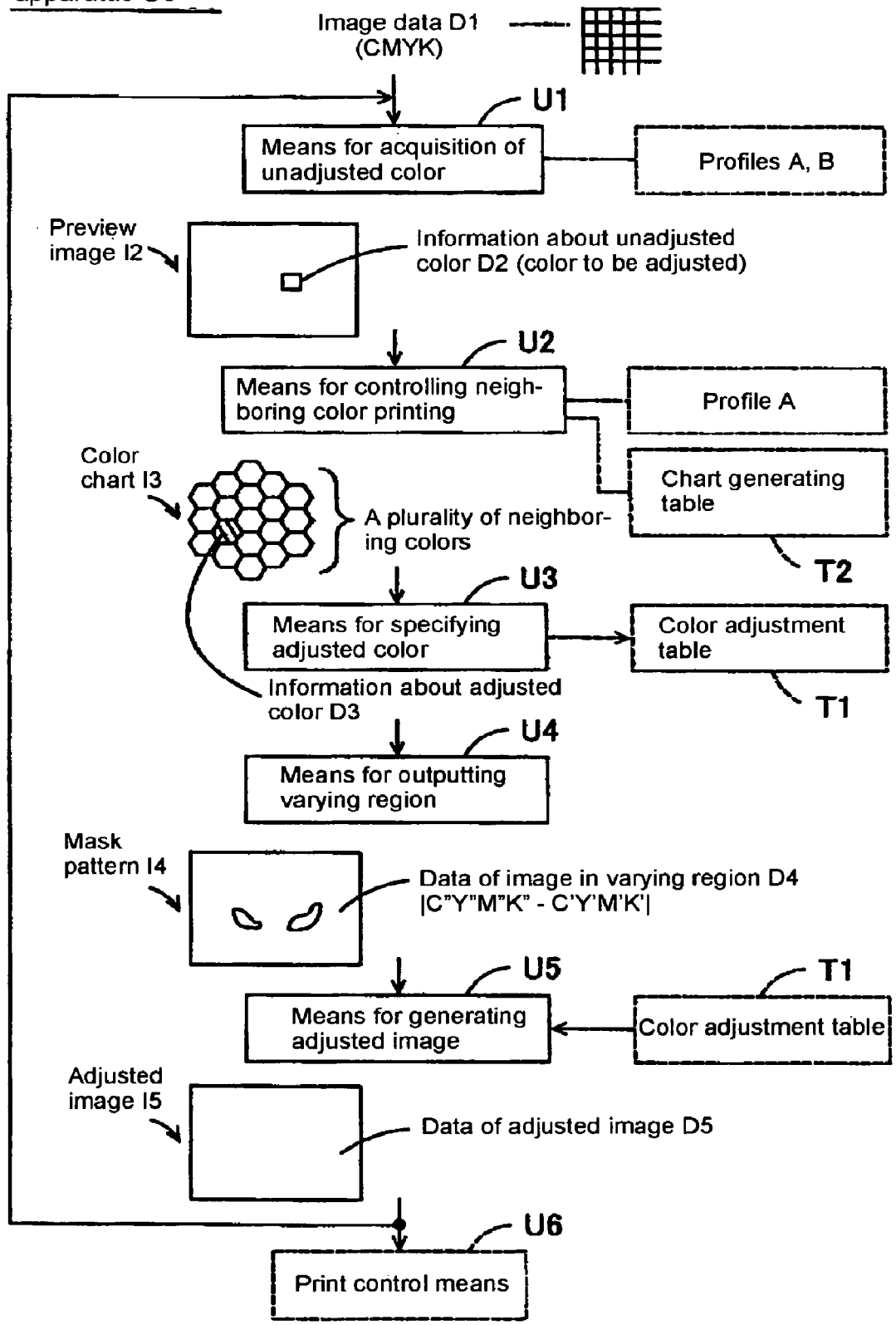
FIG. 3 is a schematic diagram showing the interrelation of units constituting the color adjustment apparatus and print control apparatus.
Figure 4:
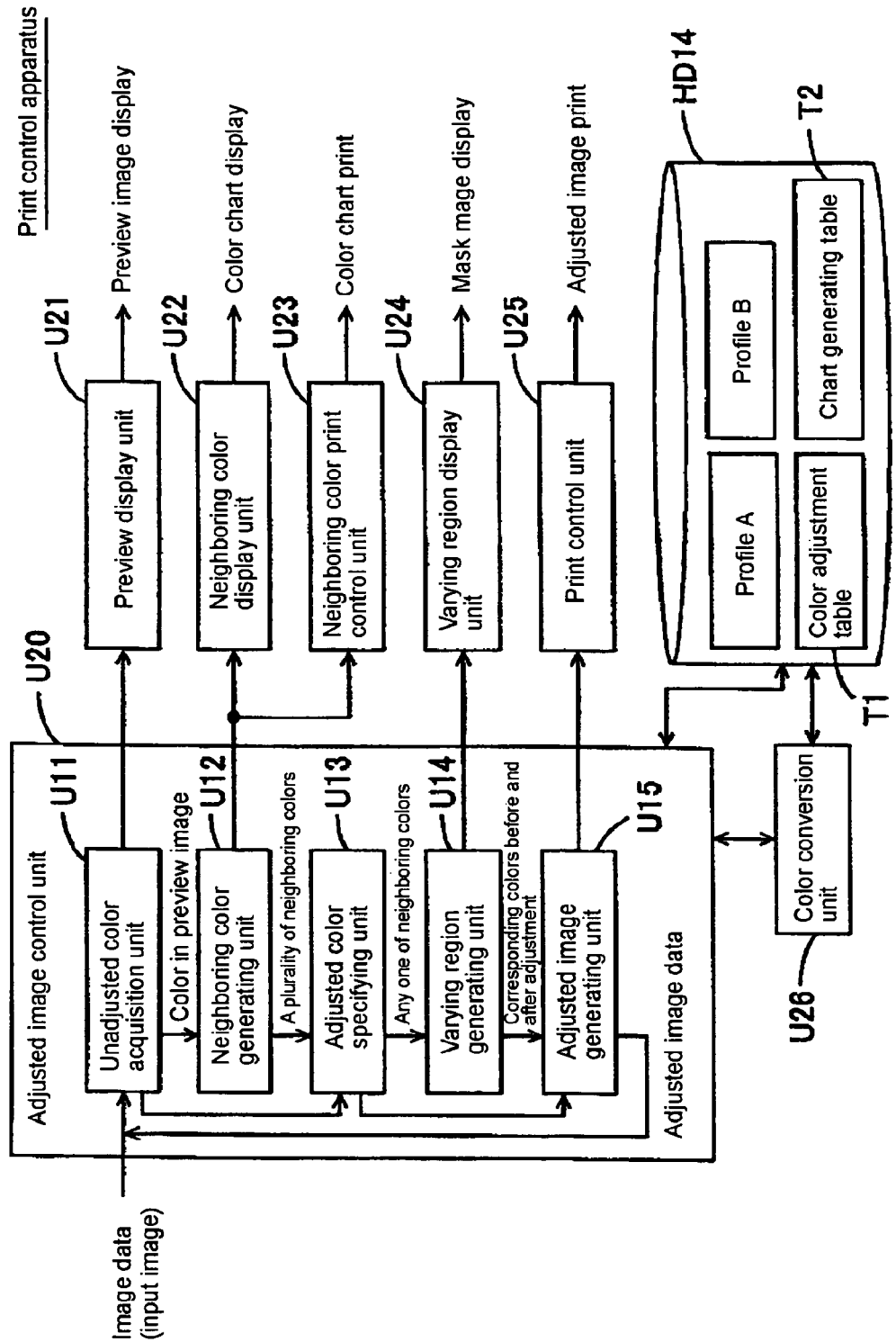
FIG. 4 is a schematic diagram showing the configuration of the print control apparatus.

FIG. 3 is a schematic diagram showing the interrelation of means constituting the color adjustment apparatus and print control apparatus. FIG. 4 is a schematic diagram showing the configuration of the print control apparatus. The color control apparatus U0 consists of means U1 to U5. It, in combination with the print control means U6, constitutes the print control apparatus. The PC is made to function as the print control apparatus by the print control program, which is composed of modules corresponding to those units U20 to U26. Incidentally, the adjusted color control unit U20 is composed of those units U11 to U15.

The color control apparatus U0 enters the image data D1 which expresses the input image in terms of color component values for a large number of pixels. Then it causes the printer to print colors for color adjustment. Finally, it generates the adjusted image data D5 which causes the printer to print adjusted images, with the input image color-adjusted.

The unadjusted color acquisition means U1 consists of the preview display unit U21, the unadjusted color acquisition unit U11, and the color conversion unit U26. The preview display unit U21 causes the CRT to display the preview image 12 according to the preview image data which expresses the halftone preview image in terms of color component values for a large number of pixels arranged in a dot matrix. The unadjusted color acquisition unit U11 receives the image data D1 and generates the preview image data that expresses the preview image of the input image according to the received image data D1. Then, it causes the CRT to display the thus generated preview image 12 and it acquires the unadjusted color information D2 that expresses the color which is contained in the preview image I and which is to be color-adjusted. Here, the unadjusted color information D2 is the unadjusted color component value that expresses by half-toning the color contained in the preview image in terms of color component value for each CMYK color. Needless to say, the unadjusted color component values are half-tone values which express the color to be adjusted in terms of color component value.

The image data that is entered is CMYK data composed of four elemental colors—C (cyan), M (magenta), Y (yellow), and K (black). However, it may be RGB data composed of R (red), G (green), and B (blue), or YCbCr data composed of Y (brightness), Cb (color difference of blue), and Cr (color difference of red). Incidentally, Y in this case is not Y standing for yellow. Each component of CMYK has a tonal range of 256. This tonal range may be 1024 or 100. The adjusted image data D5 which is eventually obtained is CMYK data composed of CMYK; however, it may be data composed of other elemental colors or data composed of elemental colors different from those of the original image data. Each component of CMYK in the adjusted image data D5 has a tonal range of 256; however, it may have a different tonal range.

The HD 14 in the PC 10 stores the color profile A and the standard color profile B. The first profile adjusts the difference in color between the image displayed on the CRT 18a and the image actually printed by the printer 20 (called actual printer A). The second profile adjusts the difference in color between the image displayed on the CRT 18a and the standard printer (called standard printer B). The color profile (referred to as profile hereinafter) is an information table which prescribes correspondence between CMYK data (before color conversion) and CMYK data (after color conversion) in terms of reference points. For this purpose, it uses $n^4$ reference points necessary for interpolation to save data amount. The unadjusted color acquisition means U1 performs color conversion on CMYK data by referencing these profiles in the color conversion unit U26 (which is a color conversion engine), and then it causes the CRT to display a preview image (corresponding to the print image of the standard printer) according to the CMYK data which has undergone color conversion.

Figure 5:
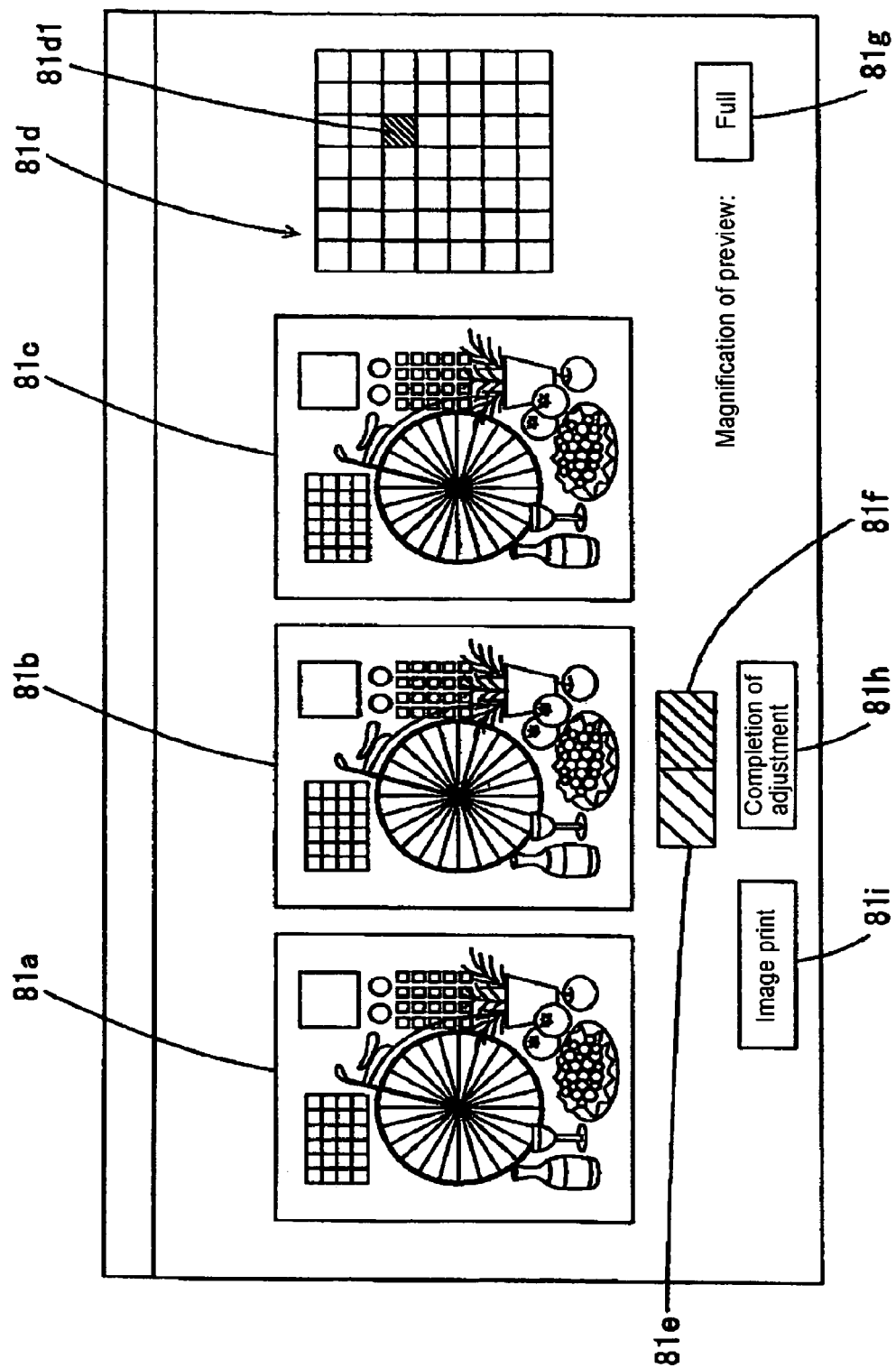
FIG. 5 is a diagram to illustrate a screen with a preview image.

FIG. 5 is an example of the screen displaying a preview image. The screen consists of the following parts.

Preview image 81a (without color conversion) displayed after conversion from original CMYK data into RGB data. (This conversion is accomplished by referencing the profile for CRT stored in the HD 14.)

Preview image 81b (with color conversion) displayed after conversion from original CMYK data into RGB data. (This conversion is accomplished by referencing the profile A.)

Preview image 81c (with color conversion) displayed after conversion from original CMYK data into RGB data. (This conversion is accomplished by referencing the standard profile B.)

Enlarged box 81d which displays a portion of the image 81b in large scale for each colored pixel.

Section 81*e* which displays the adjusted color for the pixel selected in the enlarged box 81*d*.

Section 81*f* which displays the unadjusted color for the pixel selected in the enlarged box 81*d*.

Section 81*g* for the user to enter the enlargement ratio of the preview images 81*a* to 81*c*.

Buttons 81*h* and 81*i*.

The profile for the CRT is an information table which prescribes correspondence between CMYK data and RGB data in terms of reference points. The preview image 81*b* may be regarded as a preview image of the input image. The section 81*g* (as a user interface for screen control) permits selection of a desired enlargement ratio for the preview image.

Figure 6:
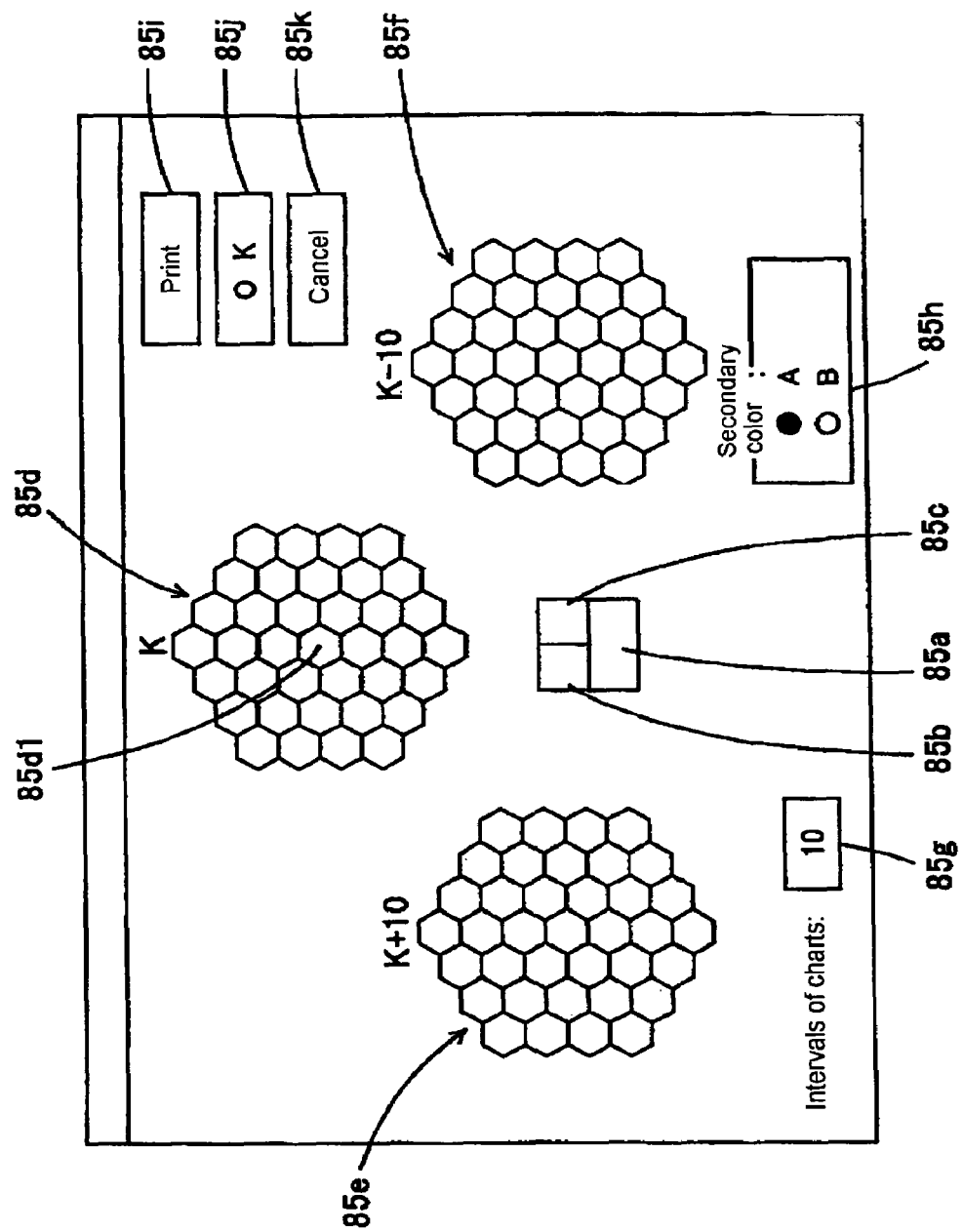
FIG. 6 is a diagram to illustrate a screen displaying color charts.

The user specifies the region for color adjustment in the preview image 81*b* (in the middle) and then specifies the region 81*d*1 of the pixel for color adjustment in the enlarged box 81*d*, by using a mouse, so that a color chart as shown in FIG. 6 appears. This color chart has the color of the specified region 81 d1 at its center.

In the above-mentioned screen, the input image expressed by the image data D1 is displayed in the preview image 81*b* as the image corresponding to the print image to be produced by the actual printer A. The color expressed by the unadjusted color information D2 is the one expressed in the region 81*d*1 of the pixel selected from the enlarged box 81*d*.

The neighboring color print control means U2 consists of the neighboring color display unit U22, the neighboring color print control unit U23, the neighboring color generating unit U12, and the color conversion unit U26. The neighboring color display unit U22 performs processing for the CRT to display the color chart according to the color chart data which expresses the color chart in half-tone in terms of color component values for a large number of pixels arranged in dot matrix. The neighboring print control unit U23 performs control for the print to print color charts according to the color chart data for the printer. The HD 14 in the PC also stores the color chart creating table T2. This table stores the color chart data representing a color chart (of a plurality of colors) for the color represented by the unadjusted color information D2 and its neighboring colors. The neighboring color generating unit U12 generates the color chart data by referencing the chart generating table T2 according to the unadjusted color information D2 which has been acquired by the unadjusted color acquisition means U1, and it causes the CRT to display the color chart according to the thus generated color chart data. Also, the color conversion unit U26 converts the color chart data into the color chart data for the printer by referencing the profile A, and it causes the printer to print the color chart 13 according to the color chart data. Hereinafter in this specification, the neighboring colors collectively means the color represented by the unadjusted color information D2 and its neighboring colors.

FIG. 6 is an example of the screen displaying the above-mentioned color chart. This screen is composed of the following sections.

Section 85*a* indicating the currently selected color.

Section 85*b* indicating the same color as that in the section 81*f* indicating the unadjusted color selected in the enlarged box 81*d*.

Section 85*c* indicating the previously selected color.

Color chart 85*d* (in honeycomb pattern) indicating CMY colors. In this chart, CMY colors change stepwise around the currently selected color.

Color chart 85*e* for CMY colors (represented by the color chart 85*d*) plus K color component.

Color chart 85*f* for CMY colors (represented by the color chart 85*d*) minus K color component.

Section 85*g* for the user to enter the intervals between the color component values to be changed which represent the color of the color chart.

Section 85*h* for the user to select and enter the setting of the secondary color.

Buttons 85*i* to 85*k*.

The color at the center 85*d*1 of the chart 85*d* is the same one as in the section 85*a* indicating the current color.

Figure 7:
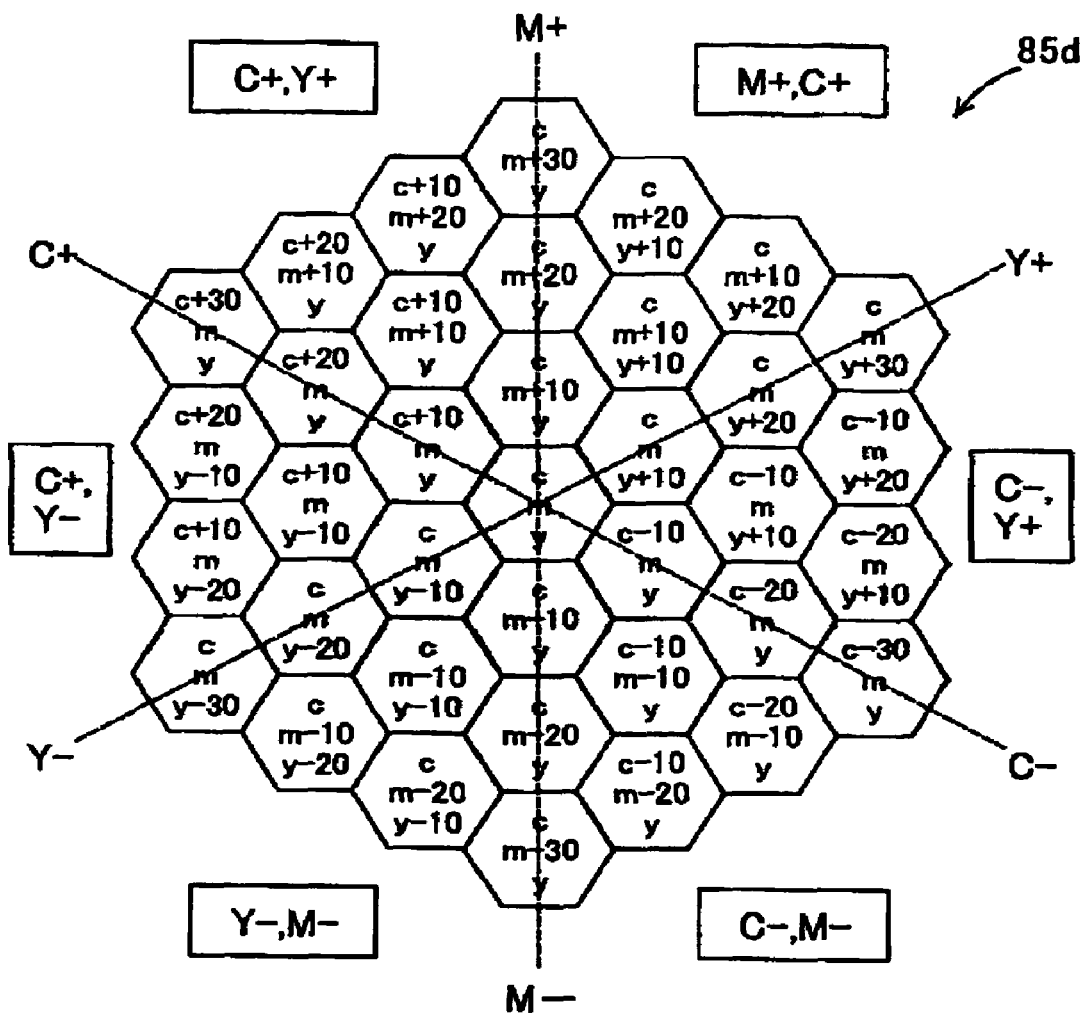
FIG. 7 is a diagram to illustrate how a color chart is composed of neighboring colors represented in terms of color component values.

As shown in FIG. 7, the color chart 85*d* is a chart showing the elemental CMY colors each arranged stepwise in three directions around the color represented by the unadjusted color information D2 or neighboring colors thereof, with the elemental K color fixed (whose color component value is k). Colors in this figure are varied such that the color component value changes at an interval of half-tone value of 10. Incidentally, in the chart 85*e*, the elemental CMY colors are varied stepwise, with the color component value of the elemental K color fixed at k+10; and in the chart 85*f*, the elemental CMY colors are varied step-wise, with the color component value of the elemental K color fixed at k−10. Colors in the chart 85*d* are arranged as follows. The color component value of M increases in going upward and decreases in going downward. The color component value of Y increases in going upper right and decreases in going lower left. The color component value of C increases in going upper left and decreases in going lower right. As shown in the figure, there are nine combinations of the secondary CMY colors, and hence the two-dimensional chart in honeycomb pattern cannot express all the combinations of the secondary CMY colors. The illustrated chart does not express the following combinations. The increasing color component values of C and the decreasing color component values of M. The increasing color component values of C and the decreasing color component values of Y. The increasing color component values of M and the decreasing color component values of Y. In order to display all the combinations of the secondary colors, the screen has the section 85*h* for selection of the secondary colors as shown in FIG. 6. This section 85*h* permits the user to select either combination A or B of the secondary colors.

Figure 8:
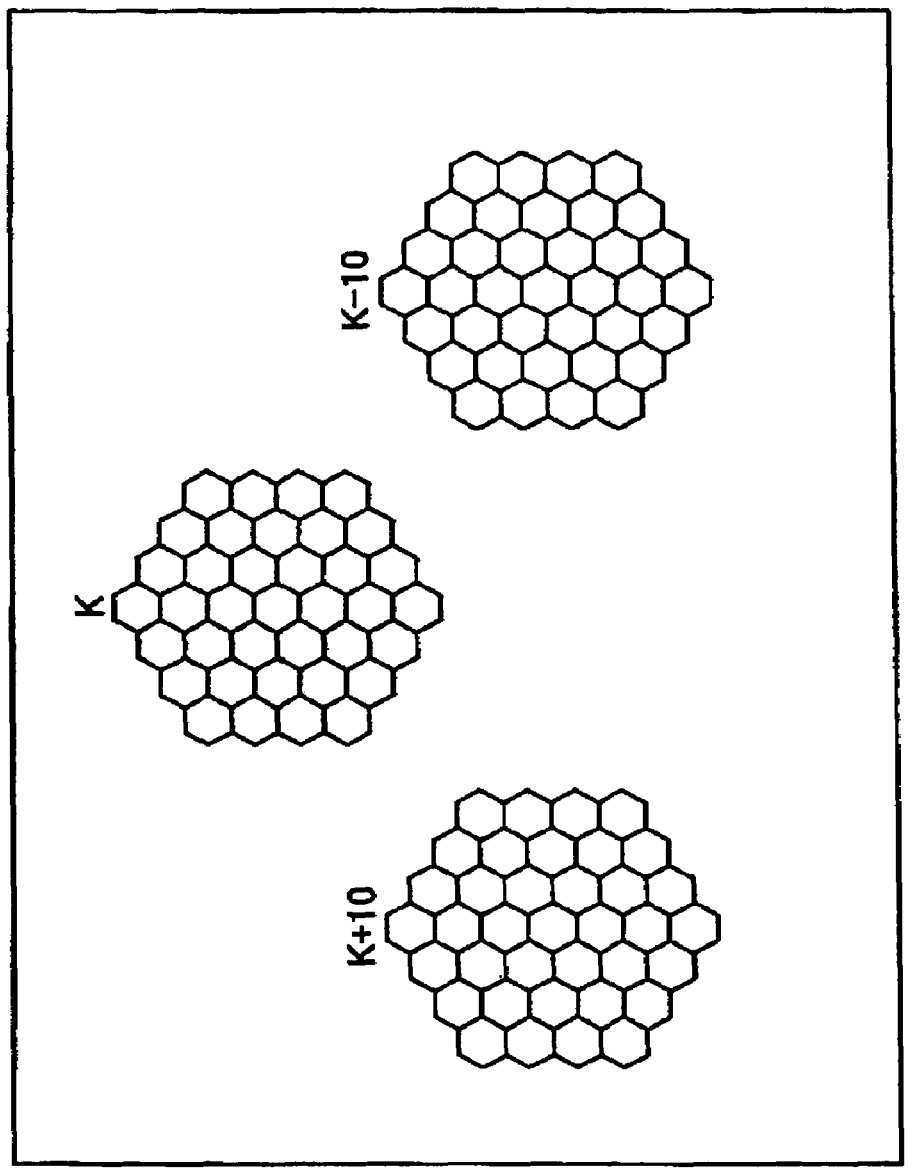
FIG. 8 is a diagram showing printed color charts.

When the user specifies with a mouse the region of the division where there is the color to be made the adjusted color in the color charts 85*d* to 85*f*, the color of the specified region is displayed in the current color display section 85*a* and the center 85*d*1 of the chart 85*d*. And, when the user clicks the print button 85*i*, the color chart corresponding to the displayed screen is printed on the printing paper, as shown in FIG. 8. Therefore, the user can confirm the color of the color chart with the printer which actually prints the image, and hence the user can perform adequate color adjustment easily. Also, the color chart in honeycomb pattern makes visible all of the three kinds of elemental colors (CMY), with neighboring colors gradually changing. This facilitates color selection and permits adequate color adjustment rapidly and easily.

The adjusted color specifying means U3 has the adjusted color specifying unit U13 which specifies, as the standard information at the time of color adjustment, the adjusted color information D3 which presents either of neighboring colors of the printed color chart 13. Here, the adjusted color information D3 is the difference between the color component value which expresses in half-tone the color component value for CMYK individually either of the printed neighboring colors and the color component value of unadjusted color represented by the unadjusted color information D2. That is, the adjusted color component value may be regarded as the gradation value which denotes in terms of color component value how much the unadjusted color deviates. The adjusted color specifying means U3 associates the unadjusted color component value with the adjusted color information D3 and stores them in the color adjustment table T1, which is stored in the HD 14 of the PC.

When the OK button 85*j* (in FIG. 6) is clicked, it acquires the color component value representing the color displayed in the current color display section 85*a* and the center 85*d*1 of the chart 85*d*. And, as shown in FIG. 9, it displays the preview image reflecting the change of the color.

Figure 9:
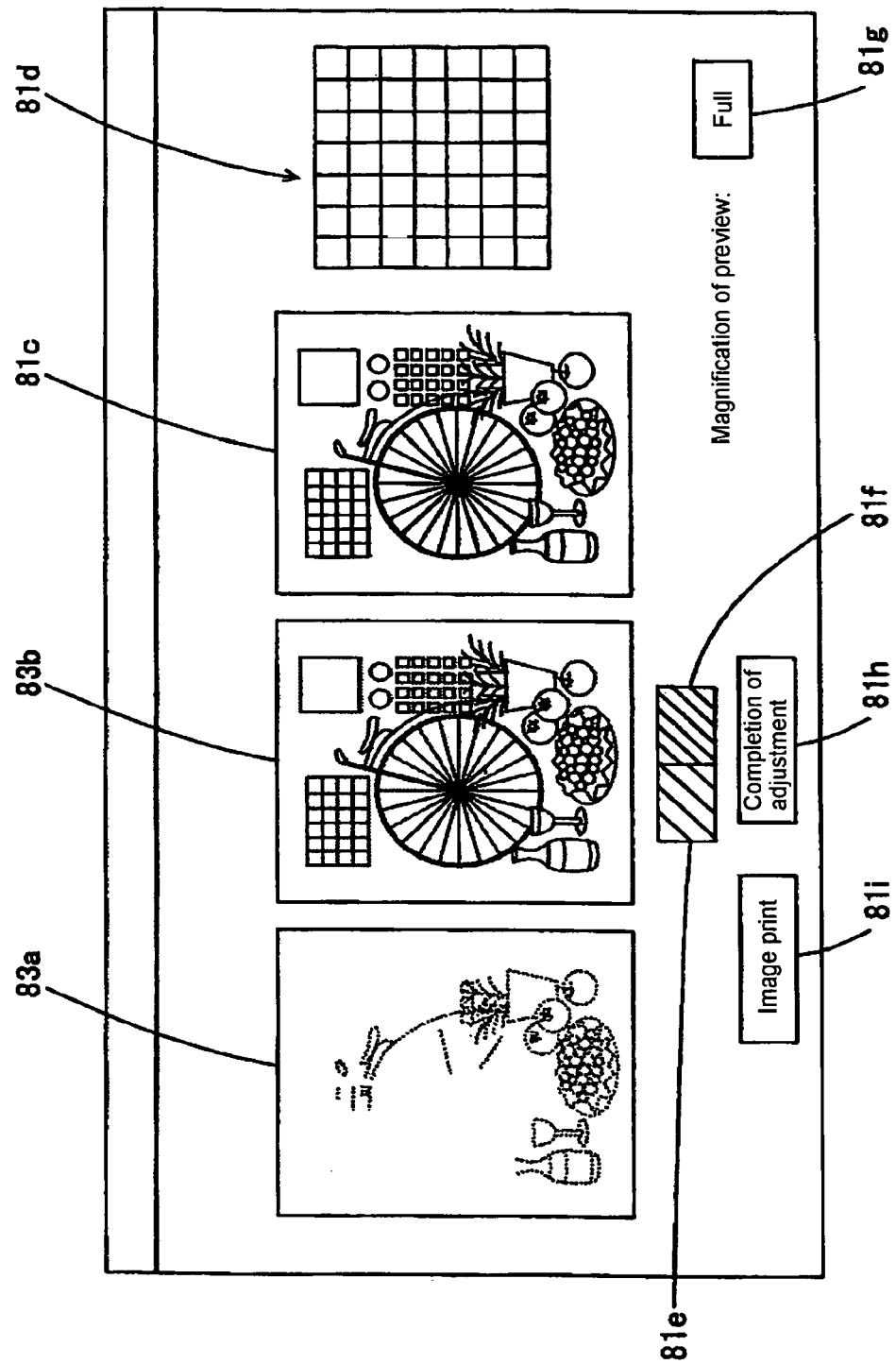
FIG. 9 is a diagram to illustrate a screen with a preview image.

FIG. 9 shows an example of the screen displaying the preview image mentioned above. This screen has the mask image 83*a* (varying region image), which, in place of the preview image 81*a* in FIG. 5, denotes the region in which color changes due to color adjustment, and the preview image 83*b*, which, in place of the preview image 81*b*, shows the image after color adjustment obtained from the color-adjusted CMYK data, which has been converted by the profile A, which has been further converted into the RGB data. Incidentally, those of the same structure as in FIG. 5 are given the same codes and their explanation is omitted. Here, the user specifies with a mouse the region in which there is the color to be adjusted in the preview image 83*b* at the center, and specifies with a mouse the region 81*d*1 of the pixel in which there is the color to be adjusted in the enlarged box 81*d*, then it is possible to perform further color adjustment. In other words, the preview image 83*b* can be said as the preview image for the adjusted image or as the preview image whose input image is the adjusted image.

The varying region output means U4 consists of the varying region display unit U24 and the varying region generating unit U14. The varying region display unit U24 displays on the CRT the mask image 14 which shows the region in which color changes due to color adjustment on the input image. To be concrete, it displays the mask image 14 according to the varying region image data D4 which expresses mask image in half-tone in terms of color component value of achromatic color (gray) for a large number of individual pixels arranged in dot matrix. The varying region generating unit U14 generates the varying region image data D4 based on the image data D1 and the unadjusted color information D2 and the adjusted color information D3 and displays on the CRT the mask image 14 based on the varying region image data D4. At this time, it generates, while referencing the profile A, the print image data (C'M'Y'K' data) which expresses the print image to be printed by the printer from the image data D1, and it generates, while referencing the same profile A, the adjusted image data (C"M"Y"K" data) from the image data D1 based on the unadjusted color information D2 and the adjusted color information D3. The varying region generating unit U14 generates the varying region image data D4 based on the difference between the print image data and the adjusted image data.

Here, if each color component value (256 tones) of the print image data is expressed as C'M'Y'K' and each color component value (156 tones) of the adjusted image data is expressed as C"M"Y"K", then the component value G (gray 256 tones) of the varying region image data may be calculated from the following formula.

$$G = \mathrm{MIN}(|C''-C'|+|M''-M'|+|Y''-Y'|+|K''-K'|, 255)$$

where, MIN(x1,x2) is a function that gives the minimal value among x1,x2.

In other words, with 255 being the upper limit, the varying region image data is the gray value (degree of change) which is the sum of the absolute values |C"−C'|, |M"−M'|, |Y"−Y'|, and |K"−K'| of the difference of each color component value. Then it is possible to grasp at a glance on a single gray color the effect of the color adjustment of the CMYK four colors.

When the varying region image data D4 is generated, the mask image 83*a* is displayed in the display screen shown in FIG. 9.

Figure 10:
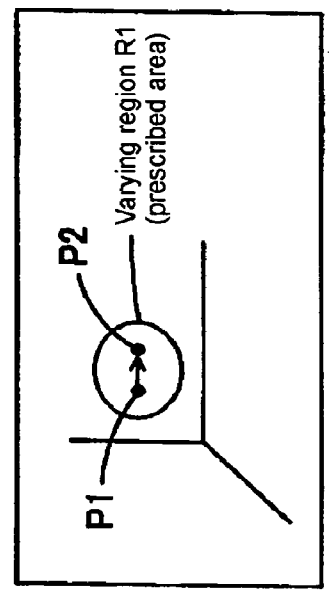
FIG. 10 is a diagram to illustrate how a mask image is created by means of a color conversion engine.

Incidentally, as shown in FIG. 10, the color conversion unit U26 (as the color conversion engine) references the profile A and the color adjusting table T1 and converts the image data of CMYK into another image data of CMYK. Here, the profile A is an information table in which are stored each color component value of CMYK in the color space capable of being displayed on the CRT 18*a* and each color component value of CMYK in the color space capable of being expressed by the actual printer A, which are associated with each other. Also, the color adjustment table T1 is an information table in which are stored each color component value before color adjustment (written as C, M, Y, K in the figure) and the amount of adjustment of each color component value (written as ΔC, ΔM, ΔY, ΔK in the figure), both for the image data composed of CMYK conforming to the actual printer reflecting the profile A, which are associated with each other.

As shown in the figure, it is assumed that the color component value of the image data D11 entered is represented by C1,M1,Y1,K1 (in 256 tones), the color component value of the print image data D13 before color adjustment reflecting the profile A is represented by C',M',Y',K' (in 256 tones), and color component value of the adjusted image data D14 after color adjustment reflecting the profile A is represented by C",M",Y",K" (in 256 tones). Then, the color conversion unit references the profile A and converts the color component values C1,M1,Y1,K1 into C',M',Y',K', and further references the color adjustment table T1 and converts the color component values C1,M1,Y1,K1 into C",M",Y", K", thereby generating the adjusted image data D14. In other words, the color conversion unit is the color conversion engine which converts the color component values C1,M1, Y1,K1 of the entered image data into the color component values C",M",Y",K" of the adjusted color data D14.

When converting the image data of CMYK by referencing the color adjustment table T1, the color conversion unit does not simply make the point P1 (C',M',Y',K') in the CMYK color space the point P2 (C",M",Y",K") but changes the color component value in the varying region R1 within a prescribed range from the point P1 (C',M',Y',K'). The amount of change of the color component value is made gradually larger in going from the boundary of the varying region R1 and it becomes a maximum near the center.

And, the difference between the print image data D13 and the adjusted image data D14 denotes the varying region R1 as the degree of change.

Incidentally, the varying region R1 shown in the figure is depicted as though it has a three-dimensional extent for all the color components in the color space. However, it may be a flat plane, curved plane, straight line, or curved line. In all of these, it is contained in the varying region R1. In this embodiment, the varying region R1 which takes on various shapes is shown, to facilitate the user's understanding, as the flat mask image which shows the region in which the color changes due to color adjustment.

The extent in which the color conversion unit changes the color component value will largely vary. For example, the varying region R1 may be determined as follows.

It is assumed that the color component values before color adjustment which is stored in the color adjustment table T1 is C3,M3,Y3,K3 (in 256 tones) and the color component value after color adjustment is C4,M4,Y4,K4 (in 256 tones). Then, it follows that the amount of adjustment (ΔC, ΔM, ΔY, ΔK) of the color component value stored in the color adjustment table T1 is C4-C3, M4-M3, Y4-Y3, K4-K3. Here, if the point within the varying region R1 is written as (C2,N2,Y2,K2), then the varying region R1 is the region of (C2,M2,Y2,K2) satisfying:

$$\{(C3-C4)/2\}-a\cdot\Delta C \leq C2 \leq \{(C3+C4)/2\}+a\cdot\Delta C \quad (2)$$

$$\{(M3-M4)/2\}-a\cdot\Delta M \leq M2 \leq \{(M3+M4)/2\}+a\cdot\Delta M \quad (3)$$

$$\{(Y3-Y4)/2\}-a\cdot\Delta Y \leq Y2 \leq \{(Y3+Y4)/2\}+a\cdot\Delta Y \quad (4)$$

$$\{(K3-K4)/2\}-a\cdot\Delta K \leq K2 \leq \{(K3+K4)/2\}+a-\Delta K \quad (5)$$

provided that a is a constant larger than 0.5, and if the inequalities (2 to 5) given above have a lower limit smaller than 0, then the lower limit is replaced by 0, and if the inequalities (2 to 5) given above have an upper limit larger than 256, then the upper limit is replaced by 256.

Needless to say, the value of the constant a may vary for CMYK individually. Also, a may be a variable which changes according to C3,M3,Y3,K3 or C4,M4,Y4,K4. Here, when the variable a to give the range of C2 is calculated, it may be varied according to not only C3 and C4 but also C3,M3,Y3,K3 or C4,M4,Y4,K4.

Further, the range of the varying region may be determined by adding or subtracting another constant which is not the multiplier of ΔC, ΔM, ΔY, ΔK.

The color component value after color adjustment for each point in the varying region R1 may be determined in the following manner.

Assuming that the lower and upper limits of C2,M2,Y2, K2 are C5,M5,Y5,K5 and C6,M6,Y6,K6, respectively, then the color component value C',M',Y',K' before color adjustment is converted into the color component value C",M", Y",K" after color adjustment. Noting the color component of C among CMYK, when $C5 \leq C' \leq C3$, $$C''=\{(C''-C5)/(C3-C5)\}\times(C4-C5)+C5,$$

when $C3 \leq C' \leq C6$, $$C''=\{(C'-C3)/(C6-C3)\}\times(C6-C4)+C4 \quad (6)$$

From this equation, it is possible to calculate the color component value C" after color adjustment. The foregoing equation (6) is one which converts by proportional distribution the color component value C" after color adjustment into C5 (lower limit)~C4 when the color component value C' before color adjustment is C5 (lower limit)~C3, and which converts by proportional distribution the color component value C" after color adjustment into C4~C6 (upper limit) when the color component value C' before color adjustment is C3~C6 (upper limit). The color component values M",Y", K" of the remaining color components MYK can also be calculated by using the foregoing equation (6).

Needless to say, it is possible to calculate the color component values C",M",Y",K" by proportional distribution from an equation representing a quadratic curve or any other curves. Also, C" may be calculated by using not only C5,C6,C' but also M5,Y5,K5, M6,Y6,K6, and M",Y",K".

Incidentally, in the case where the color adjustment table T1 stores the combination of the CMYK color component values representing a plurality of colors to be adjusted, then the color conversion unit determines the varying region for each combination and converts them into the color component values, thereby calculating the color component value C",M",Y",K" reflecting all the combination of CMYK color component values.

If the information stored in the color adjustment table T1 is not given when the color conversion unit converts the image data D11, then the color component value C",M",Y", K" after color adjustment shown in FIG. 10 becomes equal to the color component value C'M'Y'K' before color adjustment, and it follows therefore that the color component values C',M',Y',K' of the print image data D13 before color adjustment is substantially generated. So, if the color component value C'M'Y'K' of the print image data D13 is generated from the image data D11 without the information of the color adjustment table T1 given to the color conversion unit, and if the color component value C"M"Y"K" of the adjusted image data D14 is generated from the image data D11 with the information of the color adjustment table T1 given to the color conversion unit, then the difference between the color component value C'M'Y'K' and the color component value C"M"Y"K" is the varying region image data.

The adjusted image generating means U5 consists of the adjusted image generating unit U15 and the color conversion unit U26. The adjusted image generating unit U15 generates the adjusted image data D5, which expresses the adjusted image 15 to be printed by the printer from the image data D1, according to the unadjusted color information D2 and the adjusted color information D3. At this time, the color conversion unit U26 references the color adjustment table T1, thereby to obtain the adjusted color component value from the unadjusted color component value represented by the unadjusted color information D2 and the adjusted color information D3, and then references the profile A, thereby to generate the adjusted image data D5 from the image data D1 so that the unadjusted color component value becomes the adjusted color component value. The thus generated adjusted image data D5 is the data for the actual printer A reflecting the above-mentioned color adjustment operation.

The print control means U6 has the print control unit U25 which causes the printer to print the adjusted image 15 according to the adjusted image data D5 which has been generated by the adjusted image generating means U5. To be concrete, it performs half-tone processing to convert the adjusted image data D5 composed of CMYK into the half-tone data which expresses by the presence or absence of dots for CMYK individually, performs rasterizing process to generate the raster data by rearranging the half-tone data according to the scanning width of the print head of the printer, and outputs it to the printer. The half-tone data may possibly be in 2 tones, 4 tones, 10 tones, etc. In the case of 2 tones, the half-tone data "1" means "presence of dot formation" and the half-tone data "0" means "absence of dot formation". The raster data is one which represents the amount of CMYK inks. The printer 20 acquires the raster data for CMYK individually and ejects the CMYK inks on printing paper, thereby printing the adjusted image according to the adjusted image data according to the amount of ink. In this way it is possible to control the printer 20 so that it prints the adjusted image.

Incidentally, if the printer to which the CMYK data is output is capable of half-tone processing or rasterizing processing, then the CMYK data may be output to it without such processing.

(3) Processing by Color Control Apparatus

A detailed description is given below of the processing and action which are performed by the color control apparatus.

Figure 11:
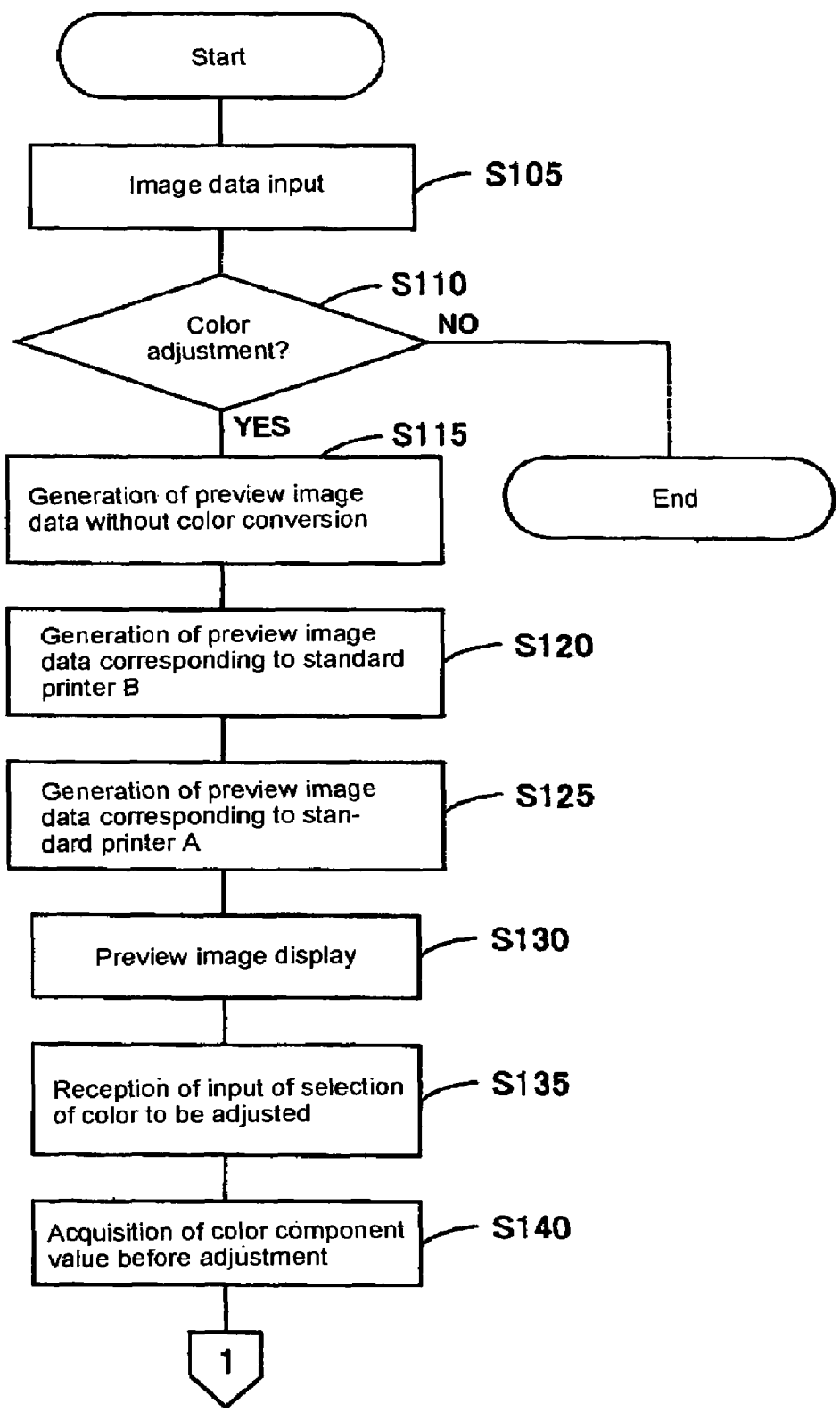
FIG. 11 is a flow chart for the process to be carried out by the color adjustment apparatus.
Figure 12:
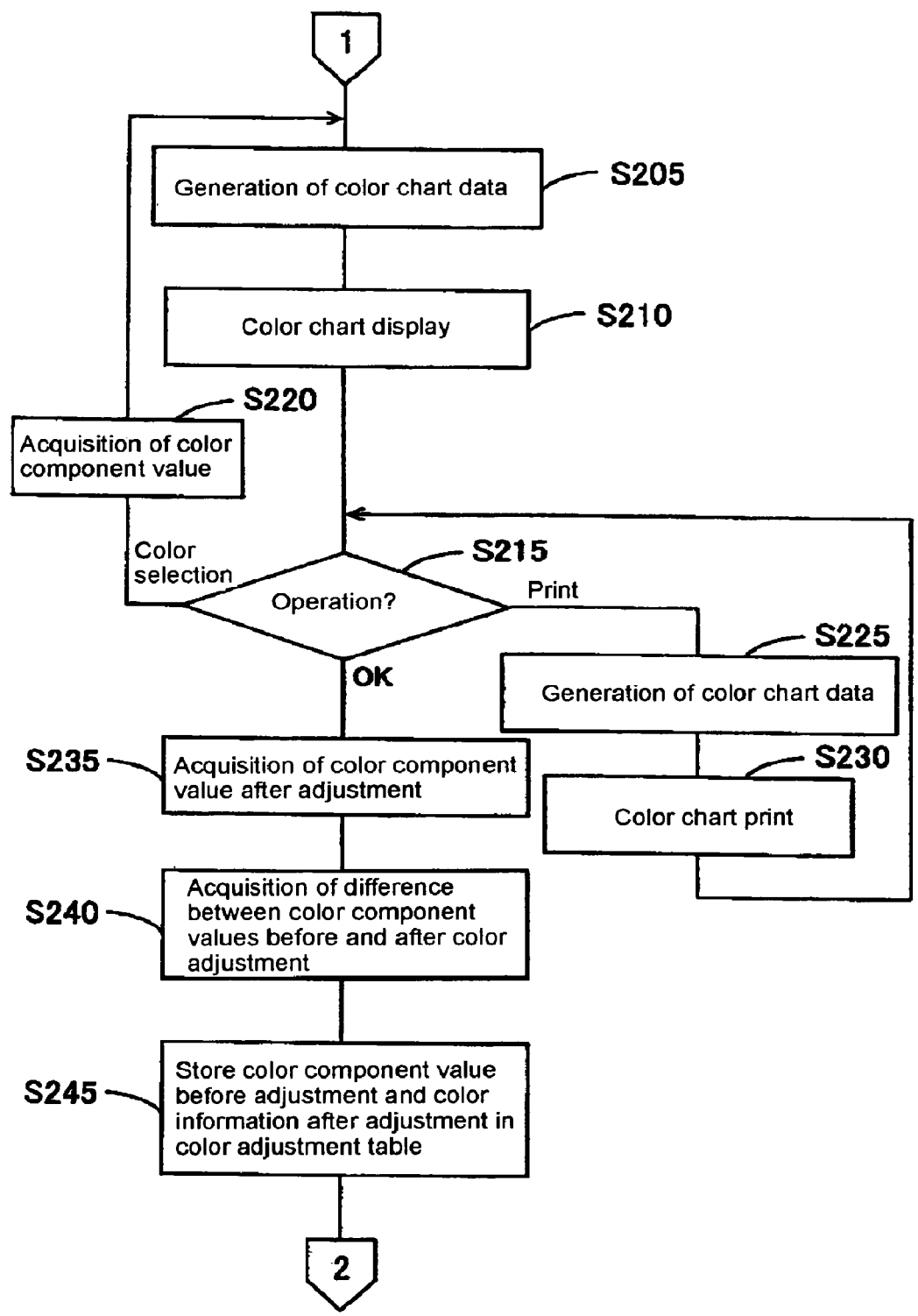
FIG. 12 is a flow chart for the process to be carried out by the color adjustment apparatus.
Figure 13:
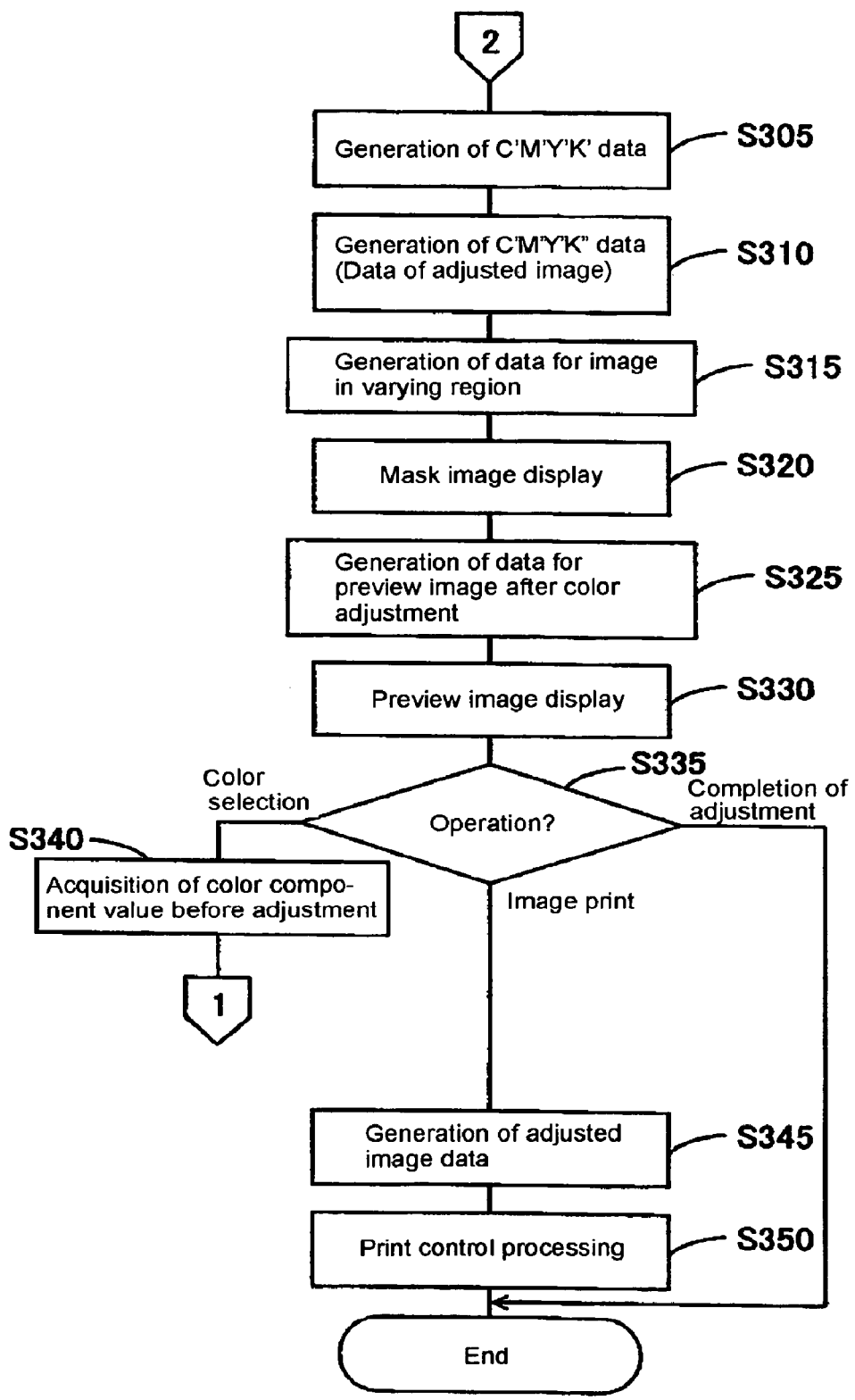
FIG. 13 is a flow chart for the process to be carried out by the color adjustment apparatus.

FIGS. 11 to 13 are flowcharts showing the process which is performed by the color control apparatus. To be concrete, the CPU 11 of the PC 10 performs the process.

When this flow starts, the image data which expresses the input image in half-tone with the color component value for CMYK individually is entered. (Step S105. "Step" will be omitted in the following.) At this time, it is not necessary to read in the entire data all at once but it may be permissible to read in the data partly. In the case where it is called from the other APL, it is only necessary to transfer the pointer which represents the buffer region to be used for data transfer.

Then, the confirmation screen to confirm that color adjustment is performed is displayed on the display, and it judges whether or not color adjustment is performed. (S110). For example, the confirmation button and cancel button are provided on the confirmation screen, so that the processing is branched according to the button operation received from the user. In the case where it is judged that color adjustment is not performed, this flow terminates.

In the case where it is judged that color adjustment is performed, it generates the preview image data expressing in half-tone the color component value of RGB individually by referencing the profile for the CRT, while sequentially moving the object pixels, with the objects for conversion being the color component value of each pixel constituting the CMYK data representing the input image. (S115). This data is one which represents the preview image 81a of the input image without color conversion in FIG. 5.

Then, it references the standard profile B, thereby to convert the CMYK data representing the input image, and it references the profile for the CRT, thereby to generate the preview image data of RGB with the converted CMYK data. (S120) To be concrete, first, it sequentially moves the object pixels, with the object for conversion being the color component value of each pixel constituting the CMYK data and references the standard profile B, thereby to generate the CMYK data which represents in half-tone the input image corresponding to the standard printer B. Then, it sequentially moves the object pixels, with the object for conversion being the color component value of each pixel constituting the generated CMYK data and references the profile for the CRT, thereby to generate the RGB data which represents in half-tone the preview image. In the subsequent steps, this applies to the conversion of image data which is performed by referencing the profile. The preview image data to be generated is the data which represents the preview image 81c of the input image corresponding to the standard printer B.

Further, it references the profile A, thereby to convert the CMYK data representing the input image, and it references the profile for the CRT, thereby to generate the preview image data of RGB with the converted CMYK data. (S125) This data is one which represents the preview image 81b of the input image corresponding to the actual printer A.

Then, it displays the display screen of the preview image (shown in FIG. 5) on the display according to the thus generated preview image data. (S130) That is, the preview image corresponding to the print image of the standard printer B is displayed in addition to the preview image for which color adjustment is being made, so that the user can accomplish color adjustment while watching the preview image corresponding to the print image of the standard printer B. This permits adequate color adjustment rapidly and easily.

Incidentally, if input operation is performed on the magnification input section 81g, it displays each preview image which has the entered magnification.

Next, it accepts the input for the selection of color to be adjusted from the preview image of the input image. (S135) To be concrete, it accepts the input of operation to specify the region for color adjustment in the preview image 81b (in the middle of the figure), then it enlarges the preview image in the specified region and displays it in the enlarged box 81d, with colors separated for each pixel unit, and it accepts the input of operation to specify the region of pixel having a color to be adjusted in the enlarged box 81d. At this stage, it displays the color which is not yet adjusted in the unadjusted color display section 81f for the pixel selected in the enlarged box 81d, and it displays it also in the adjusted color display section 81e. It is possible to easily select the color to be adjusted from the enlarged box for each pixel, and this permits adequate color adjustment rapidly and easily.

And, it acquires the unadjusted color component value for individual CMYK which represents the color to be adjusted contained in the color displayed with color separation. (S140)

That is, the PC which performs the processing of S105 to S140 constitutes the unadjusted color acquisition means which outputs the preview image of the input image according to the image data and acquires the unadjusted color information.

After the completion of S140, it generates the color chart data by referencing the chart generating table T2 according to the unadjusted color component value which has been acquired. (S205) This data is one which expresses in half-tone the color chart (in honeycomb pattern) in which the elemental colors CMY are changed stepwise in three direction around the neighboring color of the color represented by the unadjusted color component value. Incidentally, when the input for section is performed on the secondary color selection section 85h in FIG. 6, the color chart is generated so that it assumes the selected secondary color. Also, when the input operation is performed on the interval input section 85g, the color chart is generated which has the tone values at the entered intervals.

Next, it references the profile for the CRT, thereby to convert the color chart composed of CMYK into the RGB data, and it displays the display screen of the color chart displaying for each section, as shown in FIG. 6, according to the RGB data. (S210) Here, it displays the currently selected color (the color selected in the enlarged box 81d) in the current color display section 85a, displays the color selected in the enlarged box 81d in the unadjusted color display section 85d, and displays the previously selected color (the same color as that in the current display color section 85a when it is performed for the first time) in the previous color display section 85c.

After that, it branches the processing according to the operation performed on the display screen. (S215)

When the operation to specify the section in the color charts 85d to 85f is performed, it acquires the color component value representing the color of the specified section. (S220) Then, it returns to S220 and it generates the color chart data expressing the color chart, with the acquired color component value at the center, and it displays a new color chart.

Also, when the print button 85*i* is clicked, it references the profile A, thereby to generate the color chart data for the printer from the color chart data. (S225) Then, it causes the printer to print the color chart corresponding to the color chart displayed on the CRT, according to the thus generated color chart data. (S230) That is, it converts, by half-toning process, the color chart data of CMYK into the half-tone data and converts the half-tone data into the raster data by rasterizing process and sends the raster data to the printer 20. Then, the printer 20 gets the raster data, drives the print head according to the data, thereby causing the print head to eject ink onto printing paper, and prints on printing paper the color chart having at its center the neighboring color of the color contained in the preview image. This color chart is composed of a large number of neighboring colors arranged such that the color close to the desired color is at the center.

After the completion of S230, it returns to S215 and accepts further operations.

That is, the PC which performs the processing of S205 to S230 constitutes the neighboring color print control means which performs control to cause the printing apparatus to print a plurality of colors from the color (and its neighboring colors) represented by the unadjusted color component value.

When the above-mentioned processing is performed, the user can carry out the color adjustment work while watching the color chart which has been printed by the printer which performs actual printing, and this permits adequate color adjustment rapidly and easily. Here, the color which has been confirmed and selected on the screen can be actually printed, it is possible to confirm the difference between the screen and the color of the printed image. Also, since the color chart is composed of the neighboring colors of the color contained in the preview image, it is possible to accomplish adequate color adjustment according to the kind of the image. Moreover, it is also possible to perform color adjustment by viewing all at once a plurality of neighboring colors in which the four element colors of CMYK are changed stepwise. This permits adequate color adjustment very rapidly and easily according to the kinds of images.

When the OK button 85*j* in the display screen of the color chart is clicked, it acquires the adjusted color component value which represents the color displayed at the center 85*d*1 of the color chart 85*d* (the same color as that displayed in the current color display section 85*a*) in terms of the color component value for each CMYK. (S235) In this stage, it returns to the display screen of the preview image in FIG. 5, and it displays in the adjusted color display section 81*d* the adjusted color represented by the adjusted color component value, for the pixel selected in the enlarged box 81*d*.

Next, it acquires as the adjusted color information the difference between the adjusted color component value acquired and the unadjusted color component value. (S240) As mentioned above, assuming that the unadjusted color component value is C3,M3,Y3,K3 and the adjusted color component value is C4,M4,Y4,K4, then the adjusted color information ($\Delta$C, $\Delta$M, $\Delta$Y, $\Delta$K) is C4-C3, M4-M3, Y4-Y3, K4-K3.

And, it associates the unadjusted color component value C3,M3,Y3,K3 with the adjusted color information ($\Delta$C, $\Delta$M, $\Delta$Y, $\Delta$K), and stores it in the color adjustment table T1. (S245) The adjusted color information is regarded as the standard information at the time of color adjustment when the adjusted color image data is generated. Incidentally, in the case where information has been stored in the color adjustment table, then it additionally stores the unadjusted color component value and the adjusted color information.

After color adjustment, such information is registered in the color adjustment table, so that it is possible to reflect the adjusted color at the printing time.

That is, the PC which performs the processing of S235 to S245 constitutes the adjusted color specifying means which specifies as the standard information at the time of color adjustment the adjusted color information which represents any of the colors in the color chart printed by the printer. Needless to say, it may be said that it accepts the input of the adjusted color information.

After the completion of S245, it generates in the color conversion unit the print image data (C',M',Y',K') from the unadjusted color information (C1,M1,Y1,K1) by referencing the profile A, in such a state that the information stored in the color adjustment table T1 is not given to the color conversion unit. (S305) Then, it gives the information stored in the color adjustment table T1 to the color conversion unit, generates the print image data (C',M',Y',K') from the unadjusted color information (C1,M1,Y1,K1) by referencing the profile A, and further generates the adjusted image data (C",M",Y",K"), with color adjusted, from the image date (C',M',Y',K'), with color unadjusted, by referencing the color adjustment table T1. (S310) Further, it calculates the component value G by using the equation (1) given above and generates the varying region image data represented by the component value G. (S315) The component value G is the difference in component values between the print image data for individual CMYK and the adjusted image data; it is the half-tone value that represents achromatic colors.

As mentioned above, the simple configuration in which the color profile is referenced by using the general-purpose color conversion engine makes it possible to perform adequate color adjustment rapidly according to the kinds of images and facilitates the work for color adjustment.

And, it displays on the CRT the mask image 83*a* (shown in FIG. 9) based on the varying region image data. (S320) This mask image is expressed with difference in shade of achromatic color (gray); therefore, it is possible to grasp at a glance the effect of color adjustment regardless of difference in CMYK colors. This permits the work for color adjustment to be accomplished rapidly and easily.

Needless to say, the foregoing may be modified such that the varying region image data is expressed in half-tone with chromatic colors of CMYK and the resulting mask image is output.

That is, the PC which performs the processing of S305 to S320 constitutes the varying region output means which generates the varying region image data which expresses the image showing the region in which the color changes due to color adjustment in response to the input image based on the image data, the unadjusted color information, and the adjusted color information, and outputs the mask image.

As the mask image is displayed, the user can perform the work for color adjustment while watching the image corresponding to the input image. The permits adequate color adjustment easily according to the kinds of images.

After the completion of S320, it generates the preview image data which expresses the preview image of the adjusted image by the same processing as S125 based on the image data (C2,M2,Y2,K2) after color adjustment. (S325) Next, it displays the preview image 83*b* with color adjusted (shown in FIG. 9) on the CRT based on the generated preview image data. (S330) And, it branches the process according to the content of operation to be performed on the displayed screen. (S335)

When it accepts from the preview image of the adjusted image the input for selection of color on which color adjustment is performed, it acquires the color component value, with color unadjusted, which represents, in terms of the color component value for individual CMYK, the color to be adjusted which is contained in the preview image. (S340) As in the foregoing S135 to SS140, when it accepts the input for operation to specify the region in which there is the color to be adjusted in the preview image 83b in the middle of the screen, it enlarges the preview image in the specified region and displays it in the enlarged box 81d for individual pixels with separate colors, and it accepts the input for operation to specify in the enlarged box 81d the region of the pixel in which there is the color to be adjusted. And, it acquires the color component value, with color unadjusted, which expresses the color displayed with separate colors.

That is, the PC which performs the processing of S325 to S330 constitutes the unadjusted color acquisition means which outputs the preview image of the adjusted image based on the adjusted image data and acquires the unadjusted color information which expresses the color to be adjusted which is contained in the preview image.

Subsequently, it repeats the processing of S205 to S335. Then, in S205 to S230, control is performed to cause the printer to print a plurality of colors among from the neighboring colors based on the unadjusted color information which expresses the color to be adjusted which is contained in the preview image of the adjusted image. In S235 to S245, it specifies again the adjusted color information which represents any of the printed neighboring colors.

Consequently, the user can perform the operation for color adjustment while watching the preview image corresponding to the input image which has been color-adjusted. This permits adequate color adjustment rapidly and easily.

When the adjustment complete button 81h (in the display screen of the preview image) is clicked, this flow terminates.

When the image print button 81i (in the screen) is clicked, it references the color adjustment table which associates the unadjusted color component value with the adjusted color information by the adjusted image generating means and generates the adjusted image data from the image data. (S345) To be concrete, it references the color adjustment table T1, thereby to obtain the adjusted color component value from the unadjusted color component value and the adjusted color information, and references the profile A, thereby to generate the adjusted image data from the image data so that the unadjusted color component value is made the adjusted color component value. The adjusted image data thus generated is the data for the actual printer A which is generated based on the unadjusted color information and the adjusted color information which have generated the varying region image data which expresses the preview image.

Thus, the adjusted image data is generated such that the difference of color components values disappears, and hence this gives adjusted images with adequate color adjustment.

Subsequently, it performs the print control processing which causes the printer to print the adjusted image according to the adjusted image data thus generated (S350), and this flow terminates. In other words, it converts the image data of CMYK into half-tone data by half-tone processing, converts the half-tone data into raster data by rasterizing processing, and sends the raster data to the printer 20. Then, the printer 20 acquires the raster data, drives the print head according to the raster data, thereby ejecting inks onto printing paper, and prints on printing paper the adjusted image, with colors adjusted.

That is, the PC which performs the processing of S350 constitutes the print control means.

(4) Summary

The adjusted image which is printed by the above-mentioned processing is a color-adjusted image in which the color to be adjusted is determined from the preview image of the input image; therefore, this permits adequate color adjustment according to the kinds of input images (natural images with various color tones or non-natural images). The color chart printed by the printer is not an actual image, and hence printing the color for color adjustment does not take too much time.

According to the conventional technique, in which predetermined typical colors are printed by a color printer and more than one kind of information about neighboring colors of the typical color is generated so as to determine the color after color adjustment, it is difficult to perform delicate color adjustment corresponding to various kinds of input images, and it was necessary to repeat the printing of actual images on trial-and-error basis.

This color adjustment apparatus makes the color contained in the input image the color to be adjusted when it generates the adjusted image data which expresses the adjusted image to be printed by the printer, with the input image color-adjusted, while causing the printer to print the color for color adjustment; therefore, it facilitates adequate color adjustment suitable for various kinds of images and it permits the work for color adjustment rapidly.

As mentioned above, according to the present invention, the user sees the printed product of the color chart consisting of unadjusted neighboring colors and hence can adjust the color of the printed image to the visually desired color. It is not necessary to repeat the printing of actual images on trial-and-error basis, and hence it is possible to save printing paper and printing time. It is possible to visually confirm by mask image the effect by color adjustment of the entire image, and hence it is possible to perform highly accurate color adjustment. It is possible to make adjustment for those colors which tend to subtly depart even in the case where a colorimeter is used.

Needless to say, the present invention will be modified variously within the scope thereof, and is not limited to those embodiments mentioned above.

For example, the printer may be one which is integrated with the computer or that of dedicated type which outputs single-color images. The above-mentioned flow may be executed not only by the PC but also by the printer (partly or entirely) or the special machine for image output.

The present invention may be embodied variously as mentioned above. The present invention provides a color adjustment apparatus, print control apparatus, and color adjustment program product, which are intended to create the adjusted image data expressing adjusted images to be printed by a printing apparatus, with the input image color-adjusted, while causing the printing apparatus to print colors to be adjusted. They permit adequate color adjustment rapidly and easily for various kinds of images. The present invention may be applied to the color adjustment method.

What is claimed is:

1. A method for color adjustment by entering image data which expresses an input image in terms of more than one kind of color component value for a large number of pixels individually and then generating adjusted image data which expresses an adjusted image to be printed by a printing apparatus, with the input image color-adjusted, said method comprising:

a step of outputting a preview image of said input image according to said image data and acquiring information about unadjusted color which expresses a color to be adjusted and which is contained in said preview image;

a step of controlling said printing apparatus such that it prints a plurality of colors among from the color and its neighboring colors represented by said information about unadjusted color, according to said information about unadjusted color which has been acquired;

a step of specifying information about adjusted color which represents any of the plurality of printed colors, as standard information at the time of color adjustment;

a step of generating varying region image data and outputting a varying region image that shows just a region having color changes due to color adjustment on said input image based on the information about the unadjusted color and the adjusted color, wherein said varying region image data is expressed in achromatic color obtained from component value differences between said input image data and said adjusted image data; and a step of generating the data for adjusted image which expresses the adjusted image to be printed by said printing apparatus from said image data, according to said information about unadjusted color and said information about adjusted color.

2. The method for color adjustment as defined in claim 1, wherein:

said step for acquiring unadjusted color outputs said preview image of adjusted image according to said adjusted image data and acquires the information about the unadjusted color to be adjusted which is contained in said preview image;

said step for controlling the printing of neighboring colors controls said printing apparatus such that it prints a plurality of colors among from the color and its neighboring colors represented by said information about unadjusted color, according to said information about unadjusted color which represents the color contained in the preview image of said adjusted image;

said step for specifying adjusted color specifies the information about adjusted color representing any of a plurality of said printed colors; and said step for generating adjusted image generates the adjusted image data to be printed by said printing apparatus from said image, according to said information about unadjusted color and said information about adjusted color.

3. The method for color adjustment as defined in claim 1, wherein:

said information about unadjusted color is the unadjusted color component value which represents the color component value of the color to be adjusted and which is contained in said preview image;

said information about adjusted color is the information which denotes the difference between the color component value representing any of said plurality of printed colors and said unadjusted color component value; and said step for generating adjusted image obtains the adjusted color component value which represents any of said plurality of printed colors from said unadjusted color component value and said information about adjusted color and generates said adjusted image data from said image data such that the unadjusted color component value is made the adjusted color component value.

4. The method for color adjustment as defined in claim 1, wherein said step for acquiring unadjusted color causes an image display apparatus to display said preview image, references the standard color profile which makes it possible to correct the difference in color of the displayed image of the image displaying apparatus and the printed image of the standard printing apparatus, and causes the image display apparatus to display the preview image corresponding to the printed image of the standard printing apparatus according to said image data, while referencing the standard color profile which makes it possible to correct the difference in color of the displayed image of the image displaying apparatus and the printed image of the standard printing apparatus.

5. The method for color adjustment as defined in claim 1, wherein said step for acquiring the unadjusted color outputs the preview image of said input image in an enlarged form, with colors separated for each pixel, and acquires said information about unadjusted color which represents the color to be adjusted and which is contained in the color which has been output in separate colors.

6. The method for color adjustment as defined in claim 1, wherein said image data is the data to express in terms of more than one kind of color component value representing respectively more than three elemental colors, and the step for controlling the printing of neighboring colors causes the printer to print a color chart (in a honeycomb pattern) in which different elemental colors change step-wise in three directions from the center which is the color or its neighboring colors which is represented by said information about unadjusted color.

7. The method for color adjustment as defined in claim 1, in which said step for acquiring unadjusted color causes the image display apparatus to display said preview image and said step for outputting the varying region references the color profile which makes it possible to correct difference in color between the display image on said displaying apparatus and the printed image of said printing apparatus, thereby generating the print image data which expresses the print image to be printed by said printing apparatus from said image data, generates said adjusted image data from said image data based on said information about unadjusted color and said information about adjusted color, and generates said varying region image data based on the difference between the print image data and the adjusted image data.

8. The method for color adjustment as defined in claim 7, in which said step for outputting the varying region generates said varying region image data in which the component value is the difference in component value between said print image data and said adjusted image data.

9. A method for color adjustment by entering image data which expresses an input image in terms of more than one kind of color component value for a large number of pixels individually and then generating adjusted image data which expresses an adjusted image to be printed by a printing apparatus, with the input image color-adjusted, said method comprising:

an unadjusted color acquisition step for acquiring information about unadjusted color which expresses a color to be adjusted and which is contained in said input image according to said image data;

an adjusted color specifying step for accepting input of information about adjusted color which expresses the adjusted color for the color expressed by said unadjusted color information;

a varying region output step for generating the varying region image data which expresses a varying region image which shows just a region having color changes due to said color adjustment on said input image based on the information about unadjusted color and the information about adjusted color, wherein said varying region image data is expressed in achromatic color obtained from component value differences between said input image data and said adjusted image data; and an adjusted image generating step for generating the adjusted image data which expresses the adjusted image to be printed by said printing apparatus from said image data based on said information about unadjusted color and said information about adjusted color which have generated the varying region image data which expresses said varying region image which has been output.

10. A print control apparatus which enters an image data which expresses an input image in terms of more than one kind of color component value for a large number of pixels individually and then causes a printing apparatus to print an adjusted image, which is a color-adjusted input image, said apparatus comprising:

an unadjusted color acquisition unit which outputs a preview image of said input image based on said image data and acquires information about unadjusted color which expresses a color to be adjusted and which is contained in said preview image;

a neighboring color print control unit which performs control such that said printing apparatus prints more than one color from among the color and its neighboring colors expressed by said information about unadjusted color based on said information about unadjusted color which has been acquired;

an adjusted color specifying unit which specifies adjusted color information which expresses any one of said plurality of printed colors as standard information at the time of color adjustment;

a varying region generating unit that generates varying region image data and outputs a varying region image that shows just a region having color changes due to color adjustment on said input image based on the information about the unadjusted color and the adjusted color, wherein said varying region image data is expressed in achromatic color obtained from component value differences between said input image data and said adjusted image data;

an adjusted image generating unit which generates adjusted image data which expresses the adjusted image to be printed by said printing apparatus from said image data based on said information about unadjusted color and said information about adjusted color; and a control unit which causes said printing apparatus to print the adjusted image based on said adjusted image data which has been generated.

11. A color adjustment apparatus which enters an image data which expresses an input image in terms of more than one kind of color component value for a large number of pixels individually and then causes a printing apparatus to print an adjusted image, which is a color-adjusted input image, said apparatus comprising:

an unadjusted color acquisition unit which outputs a preview image of said input image based on said image data and acquires information about unadjusted color which expresses a color to be adjusted and which is contained in said preview image;

a neighboring color print control unit which performs control such that said printing apparatus prints more than one color from among the color and its neighboring colors expressed by said information about unadjusted color based on said information about unadjusted color which has been acquired;

an adjusted color specifying unit which specifies adjusted color information which expresses any one of said plurality of printed colors as standard information at the time of color adjustment;

a varying region generating unit that generates varying region image data and outputs a varying region image that shows just a region having color changes due to color adjustment on said input image based on the information about the unadjusted color and the adjusted color, wherein said varying region image data is expressed in achromatic color obtained from component value differences between said input image data and said adjusted image data; and an adjusted image generating unit which generates adjusted image data which expresses the adjusted image to be printed by said printing apparatus from said image data based on said information about unadjusted color and said information about adjusted color.

12. A color adjustment apparatus which enters an image data which expresses an input image in terms of more than one kind of color component value for a large number of pixels individually and then causes a printing apparatus to print an adjusted image, which is a color-adjusted input image, said apparatus comprising:

an unadjusted color acquisition unit which acquires information about unadjusted color which expresses a color to be adjusted and which is contained in said input image based on said image data;

an adjusted color specifying unit which accepts input of information about adjusted color which expresses adjusted color for the color expressed by said information about unadjusted color;

a varying region output unit which generates varying region image data which expresses a varying region image which shows just a region having color changes due to said color adjustment on said input image based on said image data, the information about unadjusted color, and the information about adjusted color, wherein said varying region image data is expressed in achromatic color obtained from component value differences between said input image data and said adjusted image data, and outputs the varying region image based on said varying region image data; and an adjusted image generating unit which generates adjusted image data which expresses the adjusted image to be printed by said printing apparatus from said image data based on said information about unadjusted color and said information about adjusted color which have generated the varying region image data which expresses said varying region image which has been output.

13. A color adjustment program product embodied on a computer readable medium which gives a computer a function which enters an image data which expresses an input image in terms of more than one kind of color component value for a large number of pixels individually and then generates adjusted image data which expresses an adjusted image to be printed by a printing apparatus, with the input image color-adjusted, said program product allowing the computer to realize:

an unadjusted color acquisition function which outputs a preview image of said input image based on said image data and acquires information about unadjusted color which expresses a color to be adjusted and which is contained in said preview image;

a neighboring color print control function which performs control such that said printing apparatus prints more than one color among from the color and its neighboring colors expressed by said information about unadjusted color based on said information about unadjusted color which has been acquired;

an adjusted color specifying function which specifies adjusted color information which expresses any one of said plurality of printed colors as standard information at the time of color adjustment;

a varying region output function that generates varying region image data and outputs a varying region image that shows just a region having color changes due to color adjustment on said input image based on the information about the unadjusted color and the adjusted color, wherein said varying region image data is expressed in achromatic color obtained from component value differences between said input image data and said adjusted image data; and an adjusted image generating function which generates the adjusted image data which expresses the adjusted image to be printed by said printing apparatus from said image data based on said information about unadjusted color and said information about adjusted color.

14. A color adjustment program product embodied on a computer readable medium which gives a computer a function which enters an image data which expresses an input image in terms of more than one kind of color component value for a large number of pixels individually and then generates adjusted image data which expresses an adjusted image to be printed by a printing apparatus, with the input image color-adjusted, said program product allowing the computer to realize:

an unadjusted color acquisition function which acquires information about unadjusted color which expresses a color to be adjusted and which is contained in said input image based on said image data;

an adjusted color specifying unit which accepts input of information about adjusted color which expresses adjusted color for the color expressed by said information about unadjusted color;

a varying region output function which generates varying region image data which expresses a varying region image which shows just a region having color changes due to said color adjustment on said input image based on said image data, the information about unadjusted color, and the information about adjusted color, wherein said varying region image data is expressed in achromatic color obtained from component value differences between said input image data and said adjusted image data, and outputs the varying region image based on said varying region image data; and an adjusted image generating function which generates the adjusted image data which expresses the adjusted image to be printed by said printing apparatus from said image data based on said information about unadjusted color and said information about adjusted color which have generated the varying region image data which expresses said varying region image which has been output.

* * * * *